(12) United States Patent
Yoshihara et al.

(10) Patent No.: US 8,302,721 B2
(45) Date of Patent: Nov. 6, 2012

(54) SNOW VEHICLE

(75) Inventors: Masanori Yoshihara, Shizuoka (JP); Kentaro Kaminishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 360 days.

(21) Appl. No.: 12/778,156

(22) Filed: May 12, 2010

(65) Prior Publication Data

US 2011/0278083 A1 Nov. 17, 2011

(51) Int. Cl.
*B62M 27/02* (2006.01)

(52) U.S. Cl. ............... 180/182; 280/21.1; 280/16

(58) Field of Classification Search ............ 180/182, 180/183, 186, 190–196; 280/21.1, 16, 28.17, 280/22

See application file for complete search history.

(56) References Cited

U.S. PATENT DOCUMENTS

| | | | | |
|---|---|---|---|---|
| 4,313,619 A * | 2/1982 | Hailer | | 280/124.138 |
| 5,029,664 A * | 7/1991 | Zulawski | | 180/190 |
| 6,655,487 B2 * | 12/2003 | Mallette et al. | | 180/190 |
| 6,942,050 B1 * | 9/2005 | Honkala et al. | | 180/182 |
| 7,014,004 B2 * | 3/2006 | Etou | | 180/190 |
| 7,422,083 B2 * | 9/2008 | Yoshihara et al. | | 180/182 |
| 2002/0041080 A1 * | 4/2002 | Moriyama et al. | | 280/609 |
| 2002/0185829 A1 * | 12/2002 | Cormican | | 280/21.1 |
| 2006/0032686 A1 * | 2/2006 | Berg | | 180/190 |
| 2006/0185920 A1 * | 8/2006 | Hibbert et al. | | 180/190 |
| 2007/0176388 A1 * | 8/2007 | Yoshihara et al. | | 280/124.137 |
| 2007/0193799 A1 * | 8/2007 | Yoshihara et al. | | 180/182 |
| 2010/0140007 A1 * | 6/2010 | Ogura et al. | | 180/182 |

FOREIGN PATENT DOCUMENTS

| | | |
|---|---|---|
| JP | 61-222890 A | 10/1986 |
| JP | 63-45357 B2 | 9/1988 |

* cited by examiner

*Primary Examiner* — John Walters
*Assistant Examiner* — James Triggs
(74) *Attorney, Agent, or Firm* — Keating & Bennett, LLP

(57) ABSTRACT

A snow vehicle includes a vehicle body, an arm member supported with respect to the vehicle body, a knuckle supported with respect to the arm member at a predetermined support point, a coupling unit arranged to couple the knuckle to the arm member, a ski member, and a ski coupling unit. The ski coupling unit couples the ski member to the knuckle such that the ski member pivots about a pitching axis with respect to the knuckle, the pitching axis extends in a width direction of the ski member. The pitching axis is disposed such that, when the vehicle is in a reference attitude of being placed on a horizontal surface, a horizontal distance from the pitching axis to a reference normal directed to the horizontal surface from the support point is shorter than a horizontal distance from the pitching axis to a steering axis.

28 Claims, 22 Drawing Sheets

SNOW VEHICLE

BACKGROUND OF THE INVENTION

1. Field of the Invention

The present invention relates to a snow vehicle.

2. Description of Related Art

A snow vehicle, such as a snowmobile, includes a vehicle body and a steering apparatus disposed at a front portion of the vehicle body (see, for example, U.S. Pat. No. 6,942,050). The steering apparatus includes a steering handle, tie rods that are displaced right and left by rotation of the steering handle, steering shafts coupled to the tie rods, and ski boards attached to lower ends of the steering shafts. The tie rods, steering shafts, and ski boards are respectively provided as pairs at left and right sides.

When the steering handle is rotated by a driver of the snowmobile, the rotation is converted to right and left displacement of the tie rods. By the tie rods being displaced to the right and left, the steering shafts and the ski boards are changed in direction. By the ski boards being changed in direction, the direction of the snowmobile is changed.

SUMMARY OF THE INVENTION

The inventors of preferred embodiments of the present invention described and claimed in the present application conducted an extensive study and research regarding a snow vehicle, such as the one described above, and in doing so, discovered and first recognized new unique challenges and previously recognized possibilities for enhancements as described in greater detail below.

The present inventors examined an arrangement that can provide good riding comfort of a snow vehicle during straight travel and yet enable the snow vehicle to move in a sportier manner when changing direction (during turning). If such an arrangement can be realized, the fun of driving can be enhanced further.

The present inventors discovered that there is room for enhancing the fun of driving in the arrangement described in U.S. Pat. No. 6,942,050. Specifically, according to the arrangement described in U.S. Pat. No. 6,942,050, each steering shaft rotates about a rotational axis that is substantially orthogonal to a snow surface. A pivot shaft, coupling a lower end of the steering shaft to the ski board, is disposed along this rotational axis. Consequently, when the steering shaft rotates about the rotational axis, a movement amount of the pivot shaft to the right and left is small.

That is, when the pair of right and left steering shafts are respectively rotated clockwise to turn the snow vehicle to the right, the pivot shaft of the ski board at an outer side (left side) of the turn moves to the left side only by a small amount. Likewise, when the pair of right and left steering shafts are respectively rotated counterclockwise to turn the snow vehicle to the left, the pivot shaft of the ski board at the outer side (right side) of the turn moves to the right side only by a small amount.

Thus, according to the arrangement described in U.S. Pat. No. 6,942,050, the position of the pivot shaft of the ski board at the outer side of the turn during turning of the snow vehicle cannot be moved by a large amount toward the outer side of the turn. The ski board at the outer side of the turn receives a large force in comparison to the ski board at the inner side, and it is thus considered that a sportier turn is made possible if the ski board at the outer side can be moved by a large amount to the outer side.

Enlargement of an interval (stance) of the right and left ski boards can be considered for resolving this issue. However, the stance is not necessarily set by consideration only of the turning performance of the snowmobile and is subject to various considerations, such as securing of riding comfort during straight travel, etc. The stance thus cannot be enlarged simply in consideration of making the movement of the snowmobile during turning sporty. Moreover, unlike an automobile or a motorcycle, with which annular tires are contacting with the ground over small areas that are short with respect to a front/rear direction, ski boards that are elongated with respect to the front/rear direction are grounded over large areas with a snowmobile. Thus, with the snowmobile, forces from various directions act on the steering shafts from the ski boards and loads on the steering shafts are large.

In order to overcome the previously unrecognized and unsolved challenges described above, a preferred embodiment of the present invention provides a snow vehicle for travel on a snow surface, the snow vehicle including a vehicle body, an arm member supported with respect to the vehicle body so as to swing about a swinging axis which extends in a vehicle front/rear direction, the arm member including a cushioning member disposed between the arm member and the vehicle body, a knuckle supported with respect to the arm member at a predetermined support point, a coupling unit arranged to couple the knuckle to the arm member such that the knuckle pivots about a predetermined steering axis with respect to the arm member, a ski member arranged to slide on the snow surface, and a ski coupling unit. The ski coupling unit couples the ski member to the knuckle such that the ski member pivots about a pitching axis with respect to the knuckle, the pitching axis extends in a width direction of the ski member. The pitching axis is disposed such that, when the vehicle is in a reference attitude of being placed on a horizontal surface, a horizontal distance from the pitching axis to a reference normal directed to the horizontal surface from the support point is shorter than a horizontal distance from the pitching axis to the steering axis.

A portion of the ski member that is aligned vertically with the pitching axis is a load center portion that receives a force from the snow surface. Substantially a center of the load center portion with respect to the width direction of the ski member is a load center point.

According to the snow vehicle of the present preferred embodiment of the present invention, a horizontal distance from the steering axis to the pitching axis (load center point) can be elongated. Thus, during travel of the snow vehicle, a force tending to return the ski member to a position in a straight travel state arises (a caster effect arises). Riding comfort of the snow vehicle during straight travel can thus be improved. When the knuckle and the ski member are pivoted about the steering axis from the vehicle straight drive state, a movement amount of the load center point toward an outer side of a turn can be made adequately large. For example, when the knuckle and the ski member are pivoted clockwise (during right turning), the movement amount of the load center point to the left side can be made adequately large. Likewise, when the knuckle and the ski member are pivoted counterclockwise (during left turning), the movement amount of the load center point to the right side can be made adequately large.

Thus, during turning of the snow vehicle, the position of the load center point is positioned at a more outwardly located point of the turn in comparison to the straight drive state. The ski member can consequently receive a load at the more outwardly located point of the turn, and movement of the snow vehicle during turning can thus be made sportier. The fun of driving the snow vehicle can thus be improved because the riding comfort of the snow vehicle during straight travel can be enhanced and yet the movement of the snow vehicle during turning can be made sportier.

Moreover, in addition to elongating the horizontal distance from the steering axis to the pitching axis (load center point), the horizontal distance from the reference normal to the pitching axis is made shorter than the above horizontal distance. A distance in the vehicle front/rear direction between the load center point of the ski member and the support point can thus be shortened. A moment acting about the support point when a load from the snow surface acts upward on the load center point can thus be lessened. A bending moment that acts on the knuckle can thus be lessened, and the loads applied to the knuckle, the arm member that supports the knuckle, etc., can be lessened. An excellent effect of reduction in the loads applied to the knuckle, the arm member arranged to support the knuckle, etc., which tend to increase in load as the turning performance is enhanced, can thereby be provided.

In this case, each of the arm member, the knuckle, the coupling unit, the ski member, and the ski coupling unit may be provided at a right side and a left side of the vehicle body and be arranged symmetrically with respect to a vehicle right/left direction. According to this arrangement, when the pair of right and left knuckles are respectively rotated clockwise (during right turning), the left side ski member, which, among the pair of right and left ski members, is positioned at the outer side of the turn, mainly receives the load. Likewise, when the pair of right and left knuckles are respectively rotated counterclockwise (during left turning), the right side ski member, which, among the pair of right and left ski members, is positioned at the outer side of the turn, mainly receives the load. In both right turning and left turning of the snow vehicle, the position of the load center point in the ski member at the outer side of the turn that receives a large force can be moved by a large amount toward the outer side of the turn in comparison to during straight travel. The riding comfort of the snow vehicle during straight travel can thus be enhanced and yet the movement of the snowmobile during turning can be made sportier.

In a preferred embodiment of the present invention, an offset defined by a distance between the pitching axis and the steering axis preferably is no less than about 30 mm, for example. According to this arrangement, the pitching axis can be arranged adequately far from the steering axis. Thus, when the knuckle and the ski member are pivoted clockwise (during right turning), the movement amount of the load center point to the left side, which is the outer side of the turn, can be made adequately large. Likewise, when the knuckle and the ski member are pivoted counterclockwise (during left turning), the movement amount of the load center point to the right side, which is the outer side of the turn, can be made adequately large. Consequently, the riding comfort of the snow vehicle during straight travel can be improved and yet the movement of the snow vehicle during turning can be made sportier. Moreover, by making the offset no less than about 30 mm, for example, drivers can be made to feel good riding comfort during straight travel and feel that movement during turning of the snow vehicle is sporty.

In a preferred embodiment of the present invention, the pitching axis is arranged so as to pass through the reference normal. According to this arrangement, the pitching axis can be arranged adequately far from the steering axis. The moment acting about the support point when the load from the snow surface acts upward to the load center point can be made equal to zero. The bending moment acting on the knuckle can thus be made extremely small, and the loads applied to the knuckle, the arm member that supports the knuckle, etc., can be lessened.

In a preferred embodiment of the present invention, the ski coupling unit includes an attachment unit arranged to attach the ski member to the knuckle in a manner enabling adjustment of position in the vehicle front/rear direction. According to this arrangement, the position of the ski member with respect to the knuckle can be adjusted in the vehicle front/rear direction. The more the ski member is arranged to the front with respect to the knuckle, the more promoted is the pivoting of the ski member in the pivoting direction (the sharper the turn) when the ski member is pivoted about the steering axis. The ski member can thus be pivoted with a smaller force. Consequently, the snow vehicle can be turned smoothly and more comfortably. In addition, the more the ski member is arranged to the rear portion with respect to the knuckle, the greater the force (restoring force) that tends to return the ski member to the position in vehicle straight drive. Straight drive performance of the snow vehicle is thus enhanced, and for the driver, operation during straight travel encounters less effort or fatigue.

As mentioned above, according to the arrangement where the load center point of the ski member is arranged at a more outwardly located point of the turn during turning of the snow vehicle, the force required for pivoting the ski member tends to be large. However, by disposing the ski member more frontward with respect to the knuckle as mentioned above, the pivoting of the ski member in the pivoting direction when the ski member is pivoted is promoted, and the force required for steering can be lessened.

A snow vehicle according to a preferred embodiment of the present invention preferably includes a double wishbone type suspension device that includes a pair of an upper arm and a lower arm. Further, the lower arm is the arm member. Further, the knuckle is supported on the upper arm at an upper support point at an upper portion relative to the predetermined support point and is supported on the lower arm at a lower support point as the predetermined support point. According to this arrangement, the knuckle can be supported by the pair of upper and lower arms. Also, a load acting from the knuckle can be received reliably by the lower arm.

Preferably, in this case, the pitching axis is disposed between the upper support point and the lower support point with respect to the vehicle front/rear direction. According to this arrangement, a load from the load center point of the ski member can be received by both the upper arm and the lower arm. The load from the ski member and the knuckle can thus be received in a well-balanced manner by the pair of upper and lower arms. Consequently, a support rigidity of the knuckle can be increased.

According to another preferred embodiment of the present invention, the coupling unit includes a first coupling portion coupled to the upper arm, a second coupling portion coupled to the lower arm, and a third coupling portion coupled to the knuckle such that the third coupling portion pivots about the steering axis with respect to the knuckle. According to this arrangement, the knuckle and the pair of upper and lower arms can be coupled with high rigidity.

Preferably, in this case, the first coupling portion and the upper arm are coupled via an upper support shaft arranged to extend in the vehicle front/rear direction such that the first coupling portion pivots about the upper support shaft with respect to the upper arm. According to this arrangement, the upper arm and the first coupling portion can be coupled while making the upper arm pivotable with respect to the first coupling portion.

Preferably, in a preferred embodiment of the present invention, the second coupling portion and the lower arm are coupled via a lower support shaft arranged to extends in the vehicle front/rear direction such that the second coupling portion pivots about the lower support shaft with respect to the lower arm. According to this arrangement, the lower arm and the second coupling portion can be coupled while making the lower arm pivotable with respect to the second coupling shaft.

Preferably, in a preferred embodiment of the present invention, the knuckle has a first structural body arranged to sandwich the third coupling portion from above and below. According to this arrangement, an upper end and a lower end of the third coupling portion can be coupled respectively with the first structural body of the knuckle. The rigidity of coupling of the coupling unit and the knuckle can thereby be increased further. By arranging the third coupling portion so as to be sandwiched by the first structural body from above and below, a bending force acting on the knuckle from the ski member is made unlikely to be transmitted to the third coupling portion. Acting of an excessive bending force on the third coupling portion can thereby be prevented.

Preferably, in this case, a steering shaft arranged to penetrate through the third coupling portion along the steering axis and supported by the third coupling portion such that the steering shaft rotates about the steering axis with respect to the third coupling portion is further included. Further, preferably, the steering shaft and the first structural body are coupled rotatably together about the steering axis. According to this arrangement, the rigidity of the coupling of the knuckle and the third coupling portion of the coupling unit can be increased. Consequently, a position of the steering axis can be reliably prevented from shifting with respect to the coupling unit and the arm member. Further, by the sandwiching of the third coupling portion from above and below by the first structural body of the knuckle, the bending force that acts on the knuckle is made unlikely to be transmitted to the third coupling portion, and arising of a bending force in the steering shaft that is inserted through the third coupling portion can thus be prevented. The steering shaft can thus be pivoted more smoothly.

Preferably, in a preferred embodiment of the present invention, the first structural body includes a rear portion arranged across the upper support point and the lower support point at a rear portion of the third coupling portion. According to this arrangement, the third coupling portion of the coupling unit and the rear portion of the knuckle serve as two pillars that receive the load from the ski member. Thus, even when the ski member receives a large force from the snow surface, the large force can be received firmly by the two pillars.

Preferably, in this case, the pitching axis is disposed between the lower support point and a lower end of the rear portion with respect to the vehicle front/rear direction. According to this arrangement, the load from the load center point can be received reliably by the rear portion while disposing the pitching axis (load center point) adequately to the rear portion with respect to the steering axis.

In a preferred embodiment of the present invention, the first structural body further includes a front portion arranged across the upper support point and the lower support point at a front portion of the third coupling portion. Further, the pitching axis is disposed between a lower end of the front portion and the lower end of the rear portion with respect to the vehicle front/rear direction. According to this arrangement, the third coupling portion of the coupling unit and the front portion and the rear portion of the knuckle serve as three pillars that receive the load from the ski member. Thus, even when the ski member receives a large force from the snow surface, the large force can be received firmly by the three pillars.

Preferably, in this case, the pitching axis is disposed between the lower end of the front portion and the lower support point with respect to the vehicle front/rear direction. According to this arrangement, the load from the pitching axis (load center point) can be received reliably by the front portion.

In a preferred embodiment of the present invention, the rear portion includes a substantially parallel portion arranged to extend substantially parallel to the steering axis. Further, the pitching axis is disposed on an extension of the substantially parallel portion. According to this arrangement, the load acting on the rear portion from the pitching axis (load center point) can be received by the substantially parallel portion of the rear portion. Moreover, by the substantially parallel portion extending substantially parallel to the steering axis, the rear portion can be increased in strength against a force directed from the ski member to the rear portion and acting in a direction parallel or substantially parallel to the steering axis.

In a preferred embodiment of the present invention, the knuckle includes a second structural body that is preferably integral with the first structural body and disposed at a lower portion of the first structural body. Further, the ski coupling unit includes a pitching shaft arranged to couple the ski member to the knuckle such that the ski member swings about the pitching axis with respect to the knuckle. Further, the pitching shaft is coupled to the second structural body. According to this arrangement, the knuckle and the coupling unit can be coupled firmly by the coupling of the first structural body and the third coupling portion. Further, the second structural body and the ski member can be coupled by the coupling of the second structural body and the pitching shaft. Further, by the first structural body and the second structural body being integral with each other, the knuckle can be increased in strength.

Preferably, in this case, the second structural body is curved so as to approach a rear portion of the vehicle as the second structural body approaches a lower portion. According to this arrangement, the pitching axis can be disposed at a more rearward location of the vehicle.

In a preferred embodiment of the present invention, the first structural body includes a rear portion arranged across the upper support point and the lower support point at a rear portion of the third coupling portion. Further, the rear portion includes a substantially parallel portion arranged to extend substantially parallel to the steering axis. Further, the second structural body includes a rectilinear coupling portion arranged to be continuous in a substantially straight line with the substantially parallel portion and to be coupled to the pitching shaft. According to this arrangement, a load acting from the pitching axis (load center point) to the rear portion can be received by the substantially parallel portion of the rear portion. Moreover, by the substantially parallel portion extending substantially parallel to the steering axis, a force that is directed from the ski member to the rear portion and is a force parallel or substantially parallel to the steering axis is a compressive load that acts substantially along a longitudinal direction of the rectilinear coupling portion. An allowable load that can be received by the rectilinear coupling portion and the rear portion can thus be increased.

Preferably, in this case, the second structural body includes a stopper arranged to restrict the swinging of the ski member about the pitching axis. According to this arrangement, the ski member can be prevented from swinging more than necessary about the pitching axis.

In another preferred embodiment of the present invention, the coupling unit includes an upper spherical joint, and a lower spherical joint disposed at a lower portion relative to the upper spherical joint. Further, the knuckle is coupled to the upper arm via the upper spherical joint at the upper support point and is coupled to the lower arm via the lower spherical joint at the lower support point. According to this arrangement, the knuckle can be coupled to the pair of upper and lower arms by the pair of upper and lower spherical joints. In this case, the steering axis is a straight line joining centers of respective spherical portions of the pair of upper and lower spherical joints.

Preferably, in this case, the knuckle includes a first structural body arranged to be connected to the upper spherical joint and the lower spherical joint. Further, preferably, the first structural body includes a rear portion arranged to extend from the upper support point toward the lower support point at a rear portion of the upper spherical joint and the lower spherical joint. According to this arrangement, the rear portion of the knuckle serves as a pillar that receives the load from the ski member. Thus, even when the ski member receives a large force from the snow surface, the large force can be received firmly by the rear portion.

Preferably, in this case, the pitching axis is disposed between the lower support point and a lower end of the rear portion with respect to the vehicle front/rear direction. According to this arrangement, the load from the load center point can be received reliably by the rear portion while disposing the pitching axis (load center point) adequately to the rear portion with respect to the steering axis.

In a preferred embodiment of the present invention, the first structural body further includes a front portion arranged to extend from the upper support point toward the lower support point at a front portion of the upper spherical joint and the lower spherical joint. Further, the pitching axis is disposed between a lower end of the front portion and the lower end of the rear portion with respect to the vehicle front/rear direction. According to this arrangement, the front portion and the rear portion of the knuckle serve as two pillars that receive the load from the ski member. Thus, even when the ski member receives a large force from the snow surface, the large force can be received firmly by the two pillars.

Preferably, in this case, the pitching axis is disposed between the lower end of the front portion and the lower support point with respect to the vehicle front/rear direction. According to this arrangement, the load from the pitching axis (load center point) can be received reliably by the front portion.

In a preferred embodiment of the present invention, the knuckle includes a second structural body that is preferably integral with the first structural body and disposed at a lower portion of the first structural body. Further, the ski coupling unit includes a pitching shaft arranged to couple the ski member to the knuckle such that the ski member swings about the pitching axis with respect to the knuckle. Further, the pitching shaft is coupled to the second structural body. According to this arrangement, the knuckle and the pair of upper and lower arms can be coupled firmly by the coupling of the first structural body and the pair of upper and lower spherical joints. Further, the second structural body and the ski member can be coupled by the coupling of the second structural body and the pitching shaft. By the first structural body and the second structural body being integral with each other, the strength of the knuckle can be increased.

Preferably, in this case, the second structural body includes a stopper arranged to restrict the swinging of the ski member about the pitching axis. According to this arrangement, the ski member can be prevented from swinging more than necessary about the pitching axis.

A preferred embodiment of the present invention provides a snow vehicle for travel on a snow surface, the snow vehicle including a vehicle body, an arm member supported with respect to the vehicle body so as to swing about a swinging axis which extends in a vehicle front/rear direction, the arm member including a cushioning member disposed between the arm member and the vehicle body, a knuckle supported with respect to the arm member at a predetermined support point, a coupling unit arranged to couple the knuckle to the arm member such that the knuckle pivots about a predetermined steering axis with respect to the arm member, a ski member arranged to slide on the snow surface, and a ski coupling unit. The ski coupling unit couples the ski member to the knuckle such that the ski member pivots about a pitching axis with respect to the knuckle, the pitching axis extends in a width direction of the ski member, the pitching axis is disposed such that an offset defined by a distance with respect to the steering axis preferably is no less than about 30 mm, for example.

A portion of the ski member aligned vertically with the pitching axis is a load center portion that receives a force from the snow surface. Further, substantially a center of the load center portion in the width direction of the ski member is a load center point.

According to the snow vehicle of a preferred embodiment of the present invention, the horizontal distance from the steering axis to the pitching axis (load center point) can be elongated. Thus, during travel of the snow vehicle, the force tending to return the ski member to the position in the straight travel state arises (the caster effect arises). The riding comfort of the snow vehicle during straight travel can thus be enhanced. When the knuckle and the ski member are pivoted about the steering axis from the vehicle straight drive state, the movement amount of the load center point toward the outer side of the turn can be made adequately large. For example, when the knuckle and the ski member are pivoted clockwise (during right turning), the movement amount of the load center point to the left side can be made adequately large. Likewise, when the knuckle and the ski member are pivoted counterclockwise (during left turning), the movement amount of the load center point to the right side can be made adequately large.

Thus, during turning of the snow vehicle, the position of the load center point is positioned at a more outwardly located point of the turn in comparison to the straight drive state. The ski member can consequently receive a load at the more outwardly located point of the turn, and movement of the snow vehicle during turning can thus be made sportier. The fun of driving the snow vehicle can thus be enhanced because the riding comfort of the snow vehicle during straight travel can be enhanced and yet the movement of the snow vehicle during turning can be made sportier.

Moreover, the distance (offset) from the steering axis to the pitching axis is not simply made long but the offset is preferably made no less than about 30 mm, for example. The distance with respect to the vehicle front/rear direction between the load center point of the ski member and the support point can thus be shortened. The moment acting about the support point when the load from the snow surface acts upward on the load center point can thus be lessened. The bending moment that acts on the knuckle can thus be lessened, and the loads applied to the knuckle, the arm member that supports the knuckle, etc., can be lessened. The excellent effect of reduction in the loads applied to the knuckle, the arm member supporting the knuckle, etc., which tend to increase in load as the turning performance is enhanced, can thereby be provided.

Moreover, by making the offset preferably no less than about 30 mm, for example, good riding comfort of the snow vehicle during straight travel and a sporty-feeling movement during turning of the snow vehicle are provided.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

With each of the preferred embodiments described below, a snowmobile shall be described as an example of a snow vehicle. However, the present invention can also be applied to snow vehicles other than a snowmobile.

Figure 1:
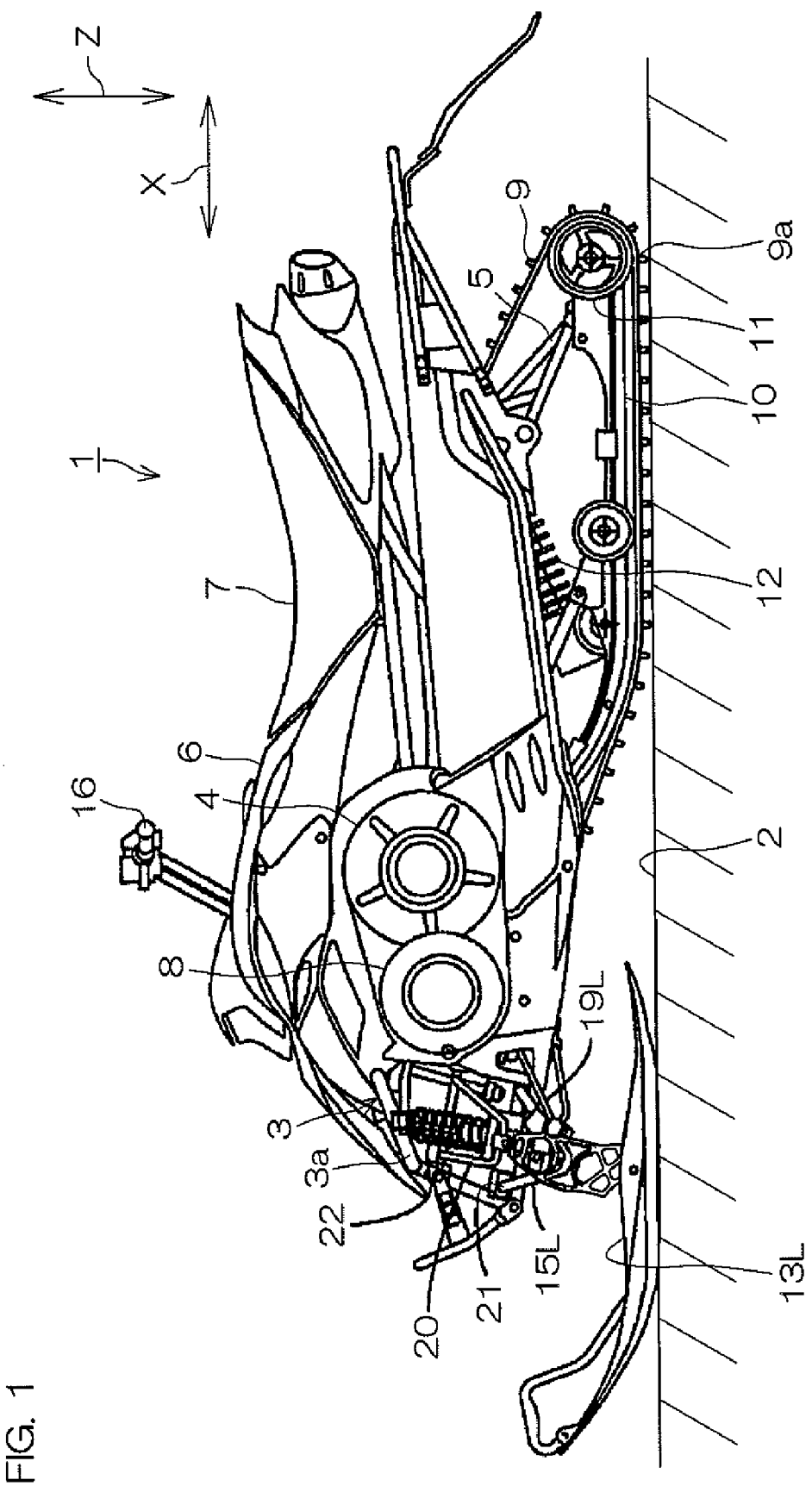
FIG. 1 is a left side view of a snowmobile according to a preferred embodiment of the present invention.

FIG. 1 is a left side view of a snowmobile 1 according to a preferred embodiment of the present invention. In the present preferred embodiment of the present invention, "front/rear direction," "right/left direction," and "up/down direction" are based on a frame of reference of a driver when the snowmobile 1 is in a reference attitude of being placed on a horizontal snow surface 2 in a straight drive state and the driver is facing forward.

The snowmobile 1 is a snow vehicle that travels on the snow surface 2. The snowmobile 1 includes a vehicle body 3, which is long with respect to the front/rear direction X, a drive apparatus 4 attached to the vehicle body 3, and a rear suspension device 5 attached to a rear portion of the vehicle body 3.

The vehicle body 3 is preferably constructed of pipe materials, steel plates, etc. A portion of the vehicle body 3 is covered by a vehicle body cover 6. A seat 7 for seating of a rider is arranged at an upper portion of the vehicle body 3.

The drive apparatus 4 generates a driving force that drives the snowmobile 1 forward or in reverse. The drive apparatus 4 includes an engine 8, a speed reducer (not shown) that reduces a speed of an output rotation of a crankshaft of the engine 8, and a track belt 9 that is rotatingly driven by an output of the speed reducer. The engine 8 is, for example, a four-cycle, multi-cylinder engine and is arranged at a front portion 3a of the vehicle body 3.

The track belt 9 is an endless belt having a fixed width to the right and left, and is arranged at a lower portion of the vehicle body 3. By rotation of the track belt 9, a forward driving force or a reverse driving force acts on the vehicle body 3. A slide rail 10 is in slidable contact with an inner circumference of the track belt 9, and a rear end portion 9a of the track belt 9 contacts the snow surface 2. A plurality of wheels, such as an idler wheel 11, etc., are arranged at the inner circumference of the track belt 9, and the track belt 9 is wound around these wheels.

The rear suspension device 5 includes a cushioning member 12 arranged at a rear lower portion of the vehicle body 3 and alleviates vibration and impact that act on the vehicle body 3 from the track belt 9.

Figure 2:
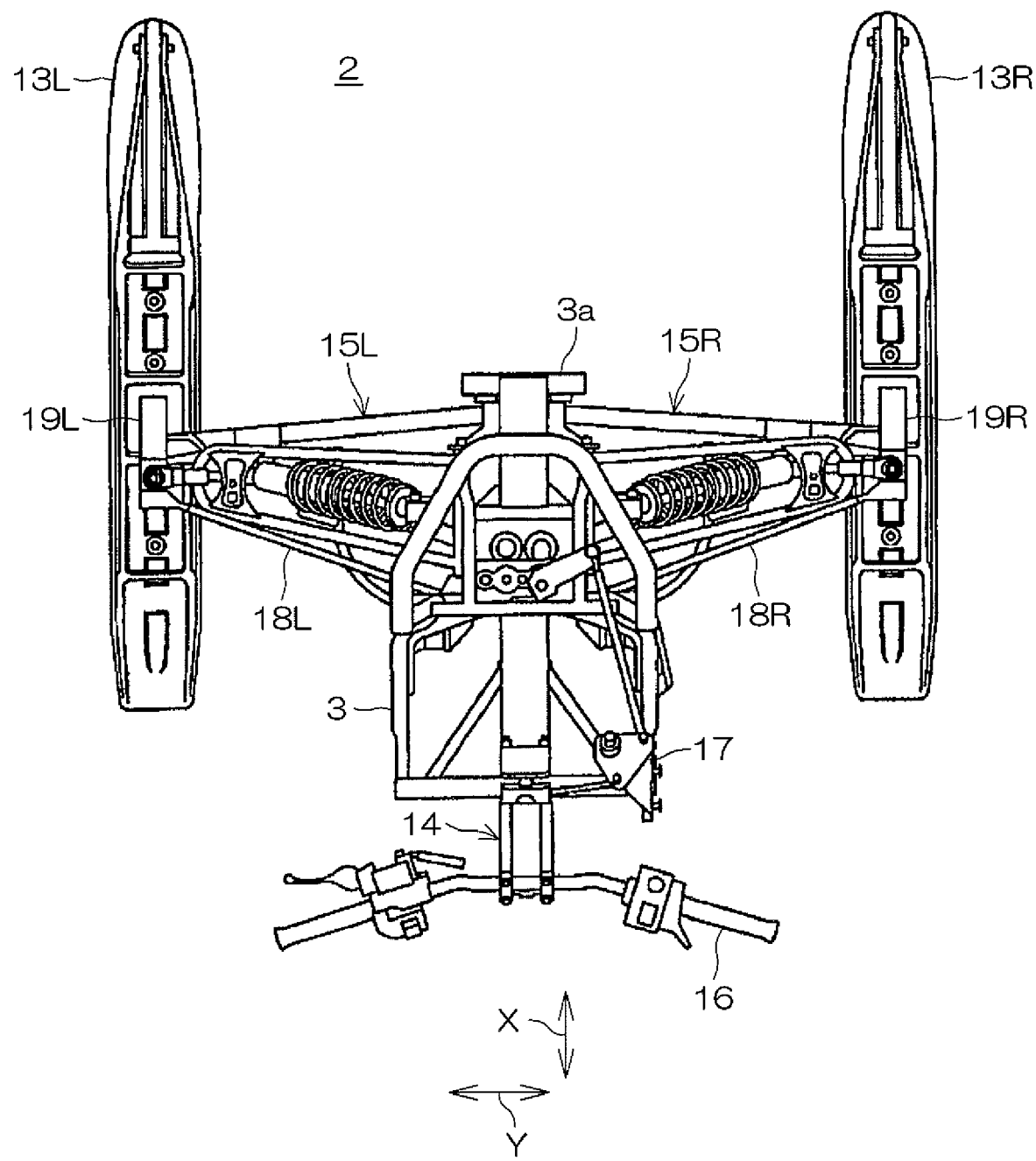
FIG. 2 is a plan view of an arrangement of principal portions of a front portion of the snowmobile.

FIG. 2 is a plan view of an arrangement of principal portions of the front portion of the snowmobile 1. The snowmobile 1 includes a pair of right and left ski members 13R and 13L arranged at the front portion 3a of the vehicle body 3, a steering apparatus 14 arranged to control directions of the pair of ski members 13R and 13L, and a pair of right and left front suspension devices 15R and 15L.

The pair of ski members 13R and 13L are arranged to slide on the snow surface 2 and are respectively arranged at a right side and a left side of the front portion 3a of the vehicle body 3. Each of the ski members 13R and 13L extends elongately with respect to the front/rear direction, is grounded on the snow surface 2, and can slide on the snow surface 2.

The steering apparatus 14 includes a handle 16, a link mechanism 17, to which a displacement of the handle 16 is transmitted, a pair of right and left tie rods 18R and 18L coupled to the link mechanism 17, and a pair of knuckles 19R and 19L connected to the pair of right and left tie rods 18R and 18L, respectively.

The handle 16 is a bar that is arranged at an upper portion of the vehicle body 3, is long to the right and left, and is pivoted clockwise or counterclockwise by operation by the driver. The link mechanism 17 is arranged to convert the pivoting operation of the handle 16 to a rectilinear motion along the right/left direction Y and transmit the motion to the pair of right and left tie rods 18R and 18L.

The tie rods 18R and 18L respectively extend to outer sides with respect to the right/left direction Y from the front portion 3a of the vehicle body 3. Base end portions of the respective tie rods 18R and 18L are connected to the link mechanism 17. Tip portions of the tie rods 18R and 18L are connected to the knuckles 19R and 19L, respectively.

The respective knuckles 19R and 19L are arranged so as to be offset from the vehicle body 3 in the right/left direction Y. The corresponding ski members 13R and 13L are respectively coupled to the knuckles 19R and 19L.

The handle 16 is pivoted by operation by the driver. The pivoting of the handle 16 is converted to the rectilinear motion in the right/left direction Y by the link mechanism 17 and is transmitted to the pair of tie rods 18R and 18L. The pair of tie rods 18R and 18L are thereby displaced to the right and left, and the directions of the pair of knuckles 19R and 19L and the pair of ski members 13R and 13L change. The snowmobile 1 can thereby be turned to the right (clockwise) or to the left (counterclockwise).

The pair of front suspension devices 15R and 15L are arranged at the respective right and left sides of the front portion 3a of the vehicle body 3. The right side front suspension device 15R is positioned between a right front portion of the vehicle body 3 and the right side ski member 13R and alleviates vibration and impact acting on the vehicle body 3 from the right side ski member 13R. The left side front suspension device 15L is positioned between a left front portion of the vehicle body 3 and the left side ski member 13L and alleviates vibration and impact acting on the vehicle body 3 from the left side ski member 13L.

The pair of ski members 13R and 13L are arranged right/left symmetrically. Likewise, the pair of tie rods 18R and 18L and the pair of knuckles 19R and 19L of the steering apparatus 14 are arranged right/left symmetrically, respectively. The pair of front suspension devices 15R and 15L are arranged right/left symmetrically.

Thus, in the following description, the left side ski member 13L and the left side front suspension device 15L shall mainly be described, and detailed description of the right side ski member 13R and the right side front suspension device 15R shall be omitted.

Figure 3:
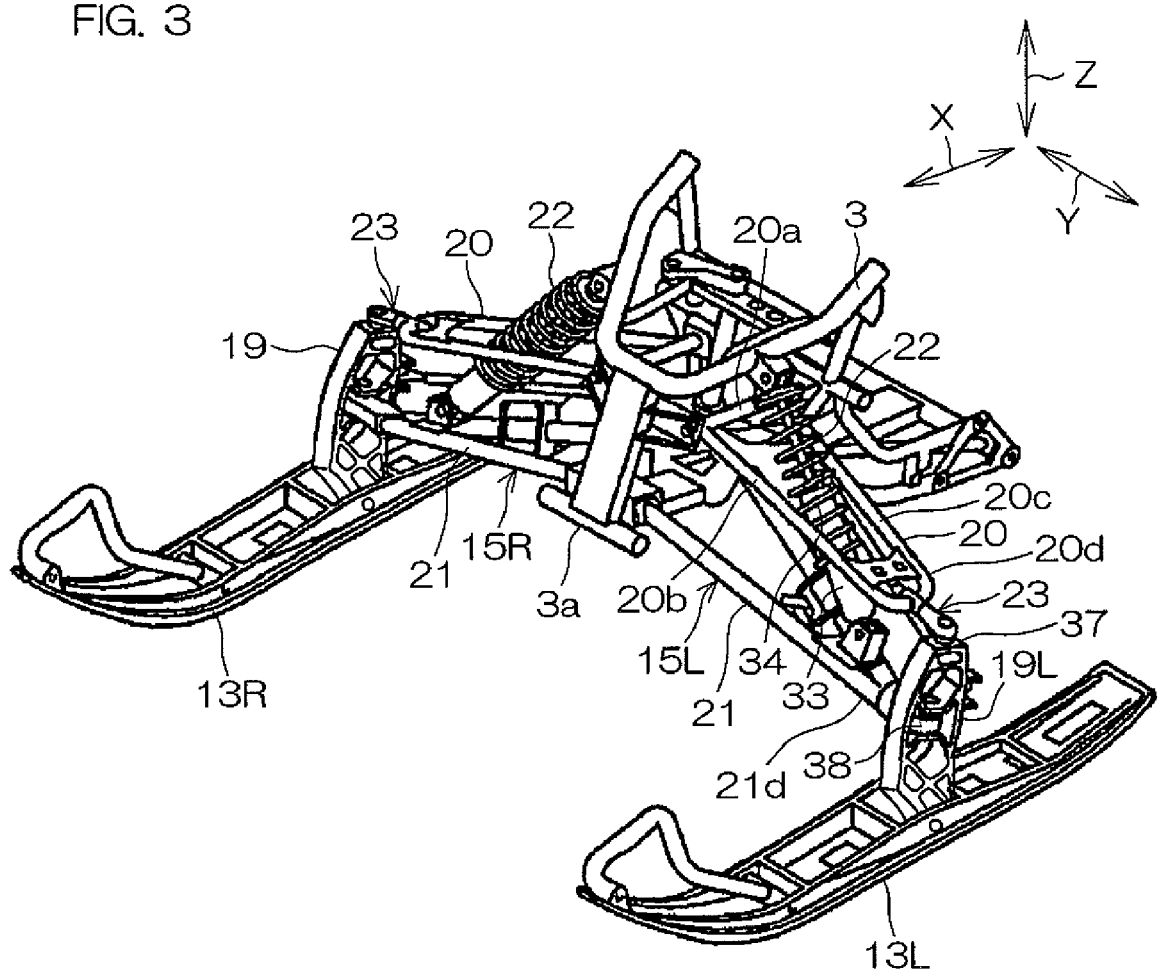
FIG. 3 is a perspective view of principal portions of the snowmobile as viewed from an obliquely upper front.

FIG. 3 is a perspective view of principal portions of the snowmobile 1 as viewed from an obliquely upper front portion. The front suspension device 15L preferably is, for example, a double wishbone type suspension device and includes a pair of upper and lower arms 20 and 21, a cushioning member 22, the knuckle 19L, and a coupling unit 23 arranged to couple the pair of upper and lower arms 20 and 21 to the knuckle 19L. The knuckle 19L is a portion of the steering apparatus 14 and is also a portion of the front suspension device 15L at the same time.

The upper arm 20 preferably has a substantially A-shaped configuration. The upper arm 20 includes a cylindrical base end portion 20a arranged to extend in the front/rear direction X, a front arm 20b arranged to extend to the left side from a front end of the base end portion 20a, a rear arm 20c arranged to extend to the left side from a rear end of the base end portion 20a, and a tip portion 20d arranged to connect tips of the front arm 20b and the rear arm 20c to each other.

Figure 4:
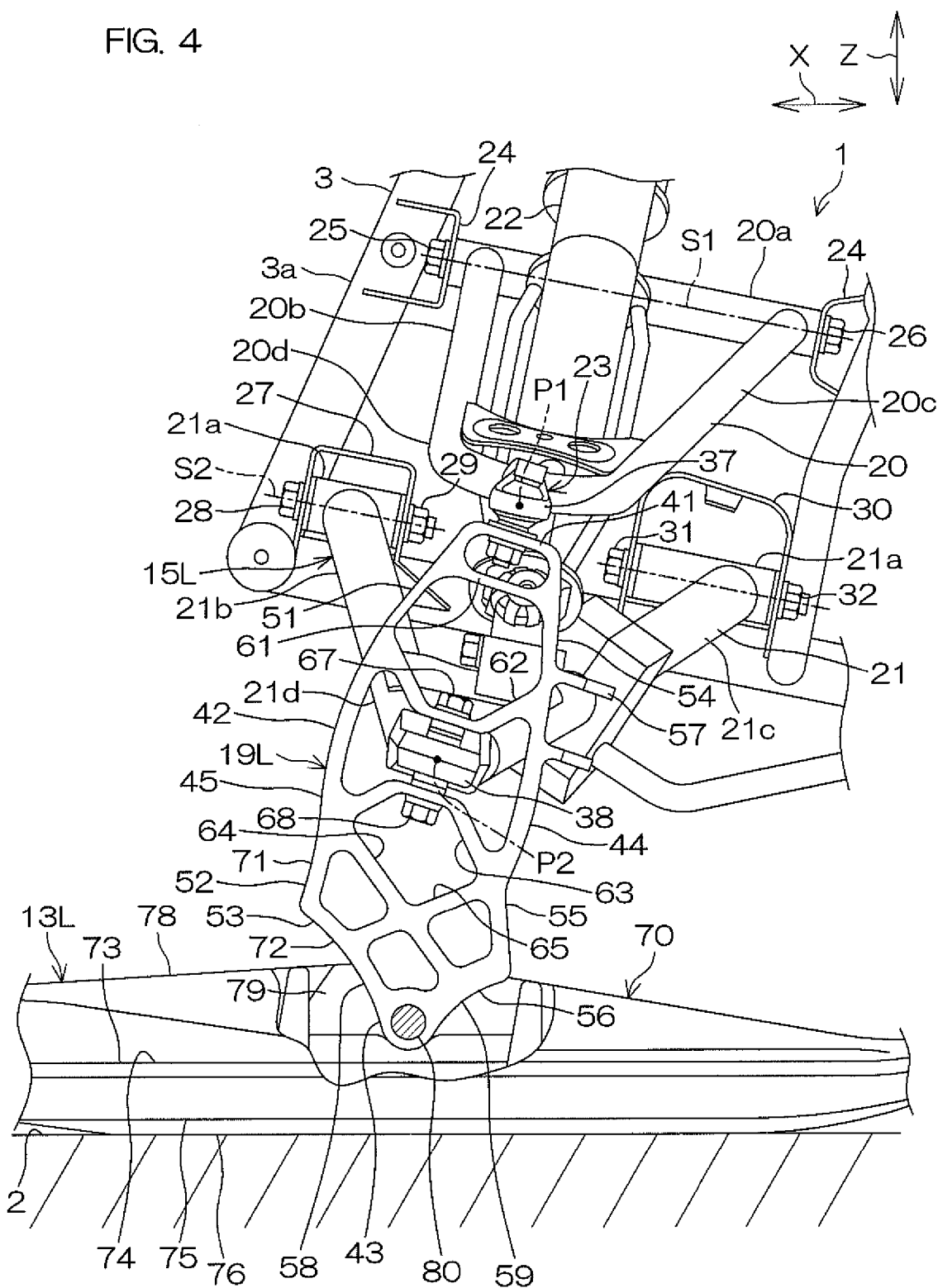
FIG. 4 is a left side view of principal portions of the snowmobile.

FIG. 4 is a left side view of principal portions of the snowmobile 1, and shows an arrangement when the snowmobile 1 in the reference attitude is viewed from a left side. The base end portion 20a is sandwiched by a pair of front and rear brackets 24 provided on the vehicle body 3.

An attachment bolt 25 that penetrates through the base end portion 20a and the pair of brackets 24 is provided. An attachment nut 26 is threadedly engaged with a tip of the attachment bolt 25. The base end portion 20a (upper arm 20) is thereby enabled to swing about a first swinging axis S1. The first swinging axis S1 extends in the front/rear direction X and is inclined obliquely upward toward the front with respect to the snow surface 2.

A mutual interval between the front arm 20b and the rear arm 20c narrows with increasing distance away to the left side from the vehicle body 3.

The lower arm 21 is an example of an "arm member" according to a preferred embodiment of the present invention. The lower arm 21 preferably has a substantially A-shaped configuration as a whole and is disposed at a lower portion of the upper arm 20. The lower arm 21 includes cylindrical base end portions 21a arranged to extend in the front/rear direction X, a front arm 21b arranged to extend to the left side from a front end of the base end portion 21a, a rear arm 21c arranged to extend to the left side from a rear end of the base end portion 21a, and a tip portion 21d arranged to connect tips of the front arm 21b and the rear arm 21c to each other.

Two base end portions 21a are aligned in the front/rear direction. The base end portion 21a at the front portion is sandwiched from the front and rear by a U-shaped front bracket 27 provided on the vehicle body 3. An attachment bolt 28 that penetrates through the front base end portion 21a and the front bracket 27 is provided. An attachment nut 29 is threadedly engaged with a tip of the attachment bolt 28.

The base end portion 21a at the rear portion is sandwiched from the front and rear by a U-shaped rear bracket 30 provided on the vehicle body 3. An attachment bolt 31 that penetrates through the rear base end portion 21a and the rear bracket 30 is provided. An attachment nut 32 is threadedly engaged with a tip of the attachment bolt 31.

According to the above arrangement, the lower arm 21 is enabled to swing about a second swinging axis S2. The second swinging axis S2 extends in the front/rear direction X and is inclined obliquely upward toward the front with respect to the snow surface 2. A mutual interval between the front arm 21b and the rear arm 21c narrows with distance away to the left side from the vehicle body 3.

Referring to FIG. 3, the cushioning member 22 is arranged between the lower arm 21 and the front portion 3a of the vehicle body 3 and passes between the front arm 20b and the rear arm 20c of the upper arm 20. The cushioning member 22 includes a hydraulic damper 33 and a coil spring 34, which is a resilient member disposed on an outer circumference of the hydraulic damper 33.

An upper end portion of the hydraulic damper 33 is attached to an upper portion of the front portion 3a of the vehicle body 3 by an unillustrated bolt and is rotatable relative to the vehicle body 3 about an axis extending to the front and rear.

A lower end portion of the hydraulic damper 33 is arranged at an upper portion of the tip portion 21d of the lower arm 21. The lower end portion of the hydraulic damper 33 is attached to the tip portion 21d of the lower arm 21 using an unillustrated bolt. The hydraulic damper 33 is rotatable relative to the lower arm 21 about an axis extending to the front and rear.

The cushioning member 22 receives a load that acts between the lower arm 21 and the front portion 3a of the vehicle body 3 and expands and contracts in accordance with the swinging of the lower arm 21.

Figure 5:
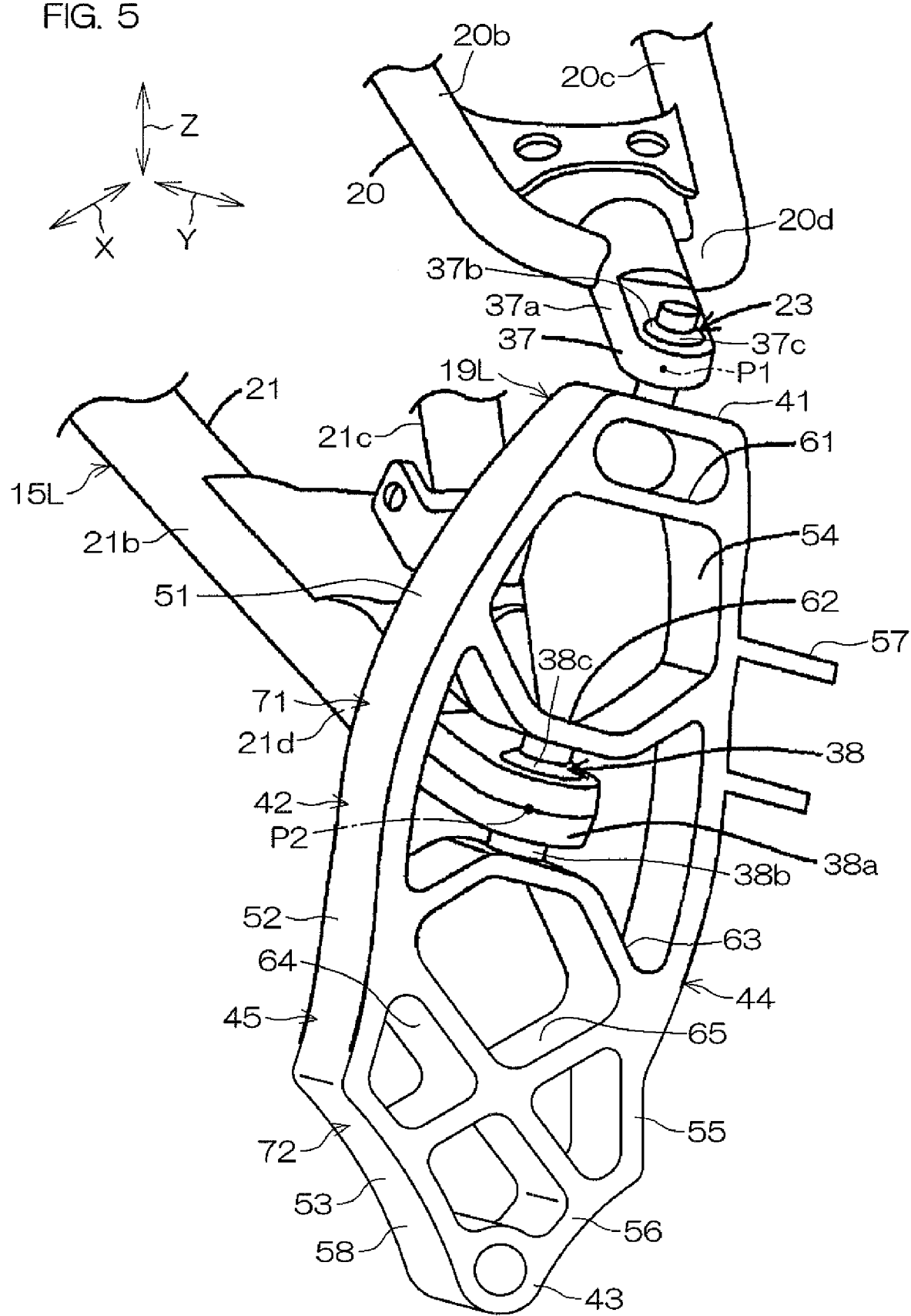
FIG. 5 is a perspective view of principal portions in a vicinity of a coupling unit and a knuckle.

FIG. 5 is a perspective view of principal portions in a vicinity of the coupling unit 23 and the knuckle 19L. The coupling unit 23 is a unit that couples the pair of upper and lower arms 20 and 21 with the knuckle 19L. The coupling unit 23 is arranged on the tip portion 20d of the upper arm 20 and the tip portion 21d of the lower arm 21.

The coupling unit 23 includes an upper spherical joint 37, and a lower spherical joint 38 arranged at a lower portion of the upper spherical joint 37.

Figure 6A:
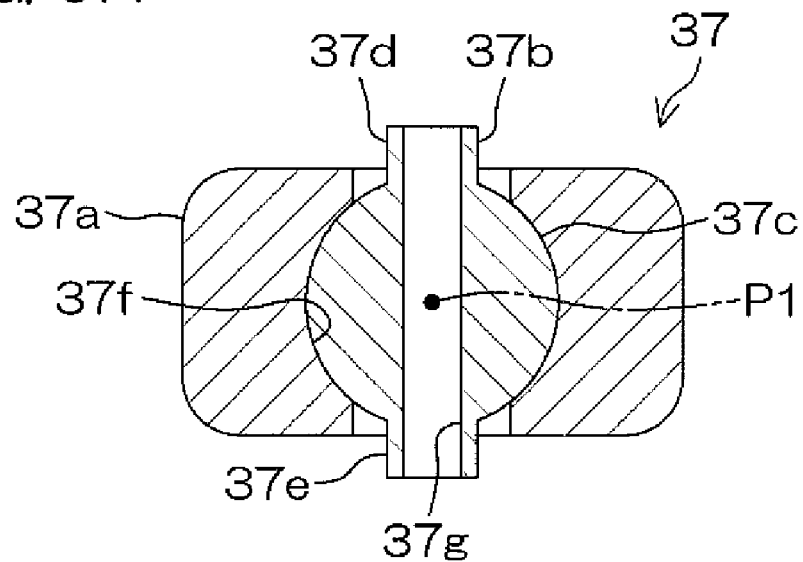
FIG. 6A is a sectional view of an upper spherical joint.

The upper spherical joint 37 includes a casing 37a and a movable portion 37b held in the casing 37a. The casing 37a is a small member fixed to the tip portion 20d of the upper arm 20 and extends to the left side from the tip portion 20d. As shown in FIG. 6A, the movable portion 37b includes a spherical portion 37c and leg portions 37d and 37e that protrude upward and downward from the spherical portion 37c. The spherical portion 37c has a substantially fixed radius of curvature and is received by a receptacle portion 37f arranged in the casing 37a. The receptacle portion 37f preferably has a shape that follows an outer surface of the spherical portion 37c and is open at upper and lower portions. The spherical portion 37c is slidably supported by the receptacle portion 37f.

The leg portions 37d and 37e extend upward and downward with respect to the spherical portion 37c and protrude upward and downward from the casing 37a. An insertion hole 37g that penetrates through the spherical portion 37c and the leg portions 37d and 37e is arranged in the movable portion 37b. An upper support point P1 is provided at a center of the spherical portion 37c.

Figure 6B:
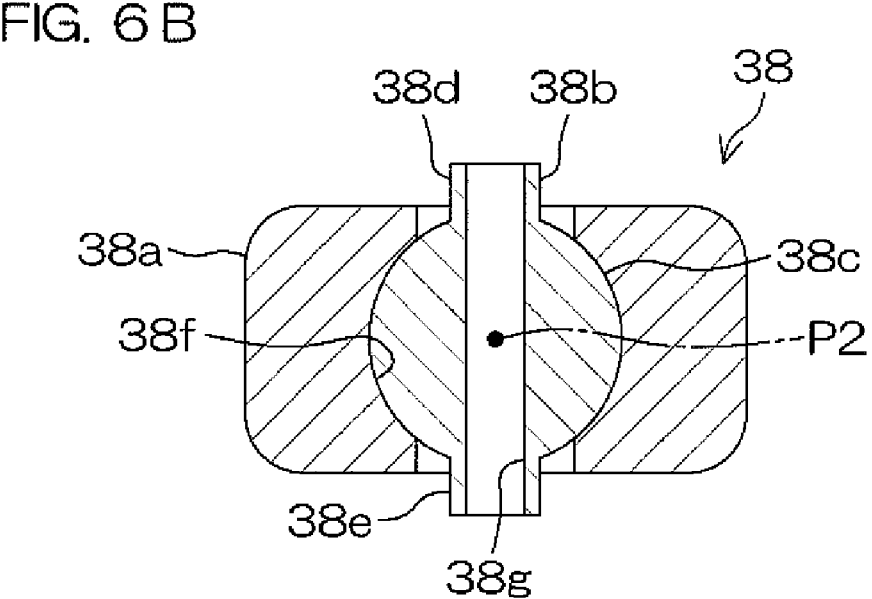
FIG. 6B is a sectional view of a lower spherical joint.

Referring to FIG. 5, the lower spherical joint 38 includes a casing 38a and a movable portion 38b held in the casing 38a. The casing 38a is a small member fixed to the tip portion 21d of the lower arm 21 and extends to the left side from the tip portion 20d. As shown in FIG. 6B, the movable portion 38b includes a spherical portion 38c and leg portions 38d and 38e that protrude upward and downward from the spherical portion 38c. The spherical portion 38c has a substantially fixed radius of curvature and is received by a receptacle portion 38f arranged in the casing 38a. The receptacle portion 38f preferably has a shape that follows an outer surface of the spherical portion 38c and is open at upper and lower portions. The spherical portion 38c is slidably supported by the receptacle portion 38f.

The leg portions 38d and 38e extend upward and downward with respect to the spherical portion 38c and protrude upward and downward from the casing 38a. An insertion hole 38g that penetrates through the spherical portion 38c and the leg portions 38d and 38e is arranged in the movable portion 38b. A lower support point P2 is provided at a center of the spherical portion 38c.

Referring to FIG. 5, the knuckle 19L is arranged at the left side of the upper arm 20 and the lower arm 21. The knuckle 19L preferably is, for example, an integrally molded article made of metal that is formed by extrusion molding, for example.

Figure 7:
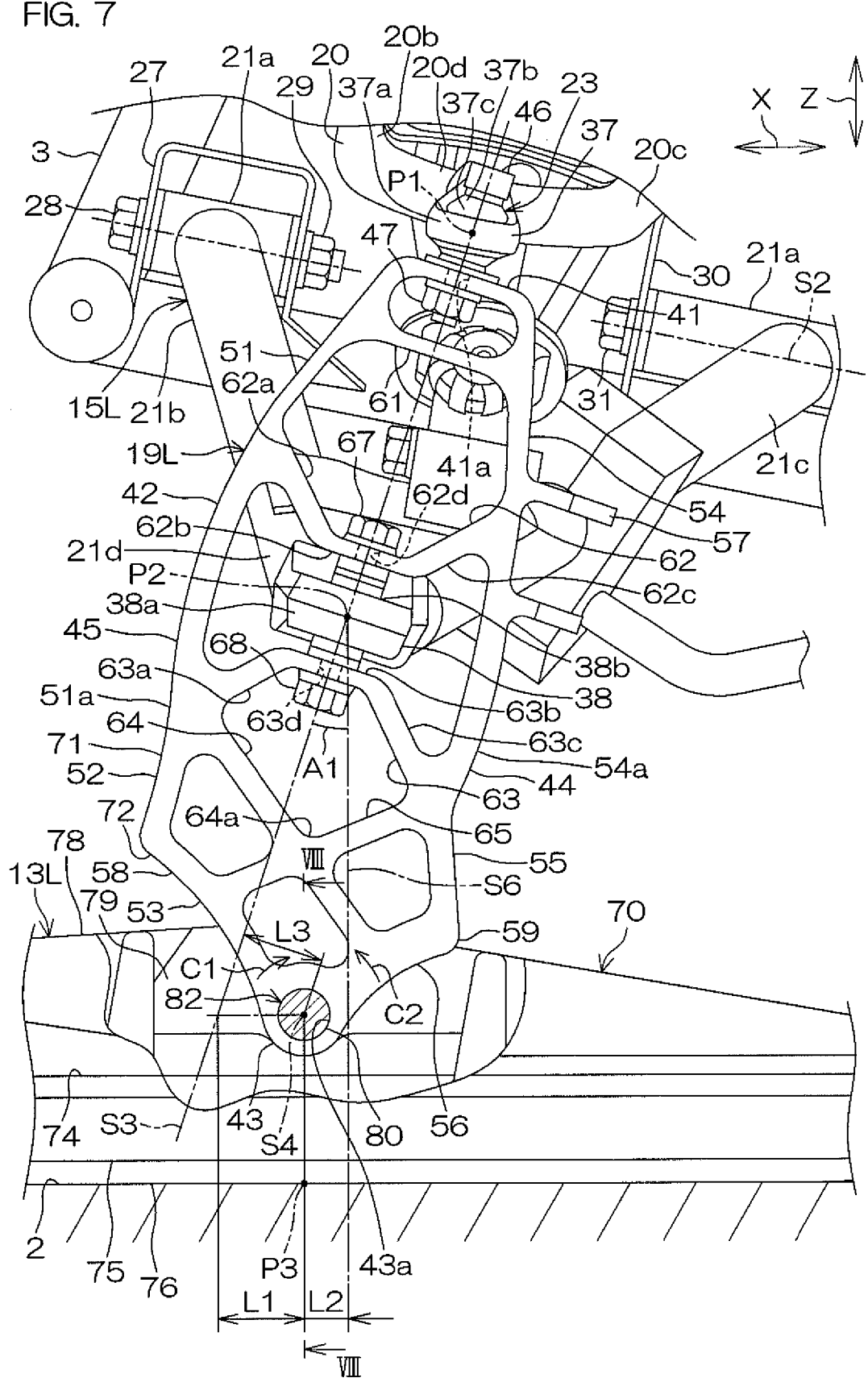
FIG. 7 is an enlarged view of a vicinity of the left side knuckle in FIG. 4.

FIG. 7 is an enlarged view of a vicinity of the knuckle 19L in FIG. 4. The knuckle 19L preferably has an oblong, annular form, for example. By being supported by the coupling unit 23 (the pair of arms 20 and 21), the knuckle 19L is enabled to rotate relative to the pair of arms 20 and 21 about a predetermined steering axis S3.

The knuckle 19L is coupled to the upper arm 20 at the upper support point P1 via the upper spherical joint 37 and is coupled to the lower arm 21 at the lower support point P2 via the lower spherical joint 38. The lower support point P2 is an example of a "predetermined support point" according to a preferred embodiment of the present invention and is positioned at a lower portion of the upper support point P1.

The steering axis S3 is a straight line passing through the upper support point P1 and the lower support point P2. The steering axis S3 extends obliquely upward toward the rear from the snow surface 2. An angle formed by the steering axis S3 and a vertical line, in other words, a caster angle A1 is preferably set, for example, to about 18° to about 23°.

An annular portion 45, including an upper end portion 41, a front portion forming member 42, a lower end portion 43, and a rear portion forming member 44, is provided in the knuckle 19L.

The upper end portion 41 extends to the front and rear substantially parallel to the second swinging axis S2 and is coupled to the upper spherical joint 37. Specifically, a bolt 46 is provided that is inserted through an insertion hole 41a arranged in the center of the upper end portion 41 and the movable portion 37b of the upper spherical joint 37. A tip of the bolt 46 is threadedly engaged with a nut 47. The nut 47 is arranged at a lower portion of the upper end portion 41. The upper end portion 41 of the knuckle 19L and the movable portion 37b of the upper spherical joint 37 are thereby fastened together. The knuckle 19L is coupled to the upper spherical joint 37 with the upper support point P1, which is the center of the movable portion 37b, as a center. The knuckle 19L is supported by the upper arm 20 with the upper support point P1 as the center.

The front portion forming member 42 is arranged at the front of the upper spherical joint 37 and the lower spherical joint 38. The front portion forming member 42 includes a first front portion 51, a second front portion 52, and a third front portion 53, and the first to third front portions 51 to 53 are disposed successively from the upper portion to the lower portion.

The first front portion 51 is an example of a "front side portion" according to a preferred embodiment of the present invention. The first front portion 51 preferably has a curved shape that is convex toward the front. The first front portion 51 extends downward from the front end of the upper end portion 41 and protrudes forward the most at a position aligned in the right/left direction with the front arm 21b of the lower arm 21. The first front portion 51 is arranged to extend toward the lower support point P2 from the upper support point P1.

The second front portion 52 preferably has a curved shape that is convex toward the rear. The second front portion 52 extends downward from a lower end 51a of the first front portion 51. A lower end of the second front portion 52 is proximal to the ski member 13L.

The third front portion 53 preferably has a substantially rectilinear shape. The third front portion 53 extends obliquely downward toward the rear from the lower end of the second front portion 52. The third front portion 53 and the steering axis S3 intersect.

The lower end portion 43 is connected to a lower end of the third front portion 53 and preferably has a shape that bulges semicircularly downward from the lower end. An insertion hole 43a, through which a pitching shaft 80 to be described later is inserted, is formed in the lower end portion 43. The insertion hole 43a penetrates through the lower end portion 43 along a thickness direction of the knuckle 19L.

The rear portion forming member 44 is arranged at the rear of the upper spherical joint 37 and the lower spherical joint 38. The rear portion forming member 44 includes a first rear portion 54, a second rear portion 55, and a third rear portion 56, and the first to third rear portions 54 to 56 are disposed successively from the upper portion to the lower portion.

The first rear portion 54 is an example of a "rear portion" according to a preferred embodiment of the present invention. The first rear portion 54 preferably has a curved shape that is slightly convex toward the rear. The first rear portion 54 extends downward from the rear end of the upper end portion 41.

The first rear portion 54 is arranged to extend toward the lower support point P2 from the upper support point P1. The movable portion 38b of the lower spherical joint 38 is arranged between the first rear portion 54 and the first front portion 51. A bracket 57, to which the left side tie rod 18L (not shown) is coupled, is fixed to an outer side surface of the first rear portion 54.

The second rear portion 55 extends downward from a lower end 54a of the first rear portion 54.

The third rear portion 56 extends between a lower end of the second rear portion 55 and the lower end portion 43. The third rear portion 56 preferably has a curved shape that is convex obliquely upward toward the front.

Inside the annular portion 45 of the knuckle 19L, a first rib 61, a second rib 62, a third rib 63, a fourth rib 64, and a fifth rib 65 are arranged in that order from the upper portion. The annular portion 45 is reinforced by the first to fifth ribs 61 to 65.

The first rib 61 is arranged at the lower portion of the upper end portion 41 and extends substantially parallel to the upper end portion 41. A front end of the first rib 61 is connected to an upper portion of the first front portion 51. A rear end of the first rib 61 is connected to an upper portion of the first rear portion 54.

The second rib 62 and the third rib 63 preferably have shapes that are symmetrical or substantially symmetrical in a direction of extension of the steering axis S3.

The second rib 62 is arranged between the first front portion 51 and the first rear portion 54. The second rib 62 includes a front portion 62a, an intermediate portion 62b, and a rear portion 62c, and the intermediate portion 62b is arranged at the lower portion with respect to the front portion 62a and the rear portion 62c.

A front end of the front portion 62a is connected to the first front portion 51 and extends obliquely downward toward the rear. The intermediate portion 62b extends rearward from the rear end of the front portion 62a and is parallel or substantially parallel to the upper end portion 41 and the first rib 61. The rear portion 62c extends obliquely upward toward the rear from a rear end of the intermediate portion 62b. A rear end of the rear portion 62c is connected to the first rear portion 54.

The third rib 63 is arranged between the lower end 51a of the first front portion 51 and the lower end 54a of the first rear portion 54. The third rib 63 includes a front portion 63a, an intermediate portion 63b, and a rear portion 63c, and the intermediate portion 63b is arranged at the lower portion with respect to the front portion 63a and the rear portion 63c.

A front end of the front portion 63a is connected to the first front portion 51 and extends obliquely upward toward the rear. The intermediate portion 63b extends rearward from the rear end of the front portion 63a and is parallel or substantially parallel to the intermediate portion 62b of the second rib 62. The rear portion 63c extends obliquely downward toward the rear from a rear end of the intermediate portion 63b. A rear end of the rear portion 63c is connected to the first rear portion 54.

The second rib 62 and the third rib 63 are coupled to the lower spherical joint 38. Specifically, screw insertion holes 62d and 63d are respectively formed in the intermediate portion 62b of the second rib 62 and the intermediate portion 63b of the third rib 63. The movable portion 38b of the lower spherical joint 38 is arranged between the intermediate portion 62b of the second rib 62 and the intermediate portion 63b of the third rib 63.

A bolt 67 inserted through the screw insertion hole 62d, the movable portion 38b, and the screw insertion hole 63d is provided. The bolt 67 is put in threaded engagement with a nut 68. The second rib 62 and the third rib 63 of the knuckle 19L are thereby fastened to the movable portion 38b. The knuckle 19L is coupled to the lower spherical joint 38 with the lower support point P2, which is the center of the movable portion 38b, as a center. The knuckle 19L is supported by the lower arm 21 with the lower support point P2 as the center.

The fourth rib 64 extends straightly or substantially straightly and obliquely downward toward the rear from a connection portion of the first front portion 51 and the second rib 62 (lower end 51a) and is connected to the third rear portion 56. The fourth rib 64 is arranged parallel or substantially parallel to the third front portion 53.

The fifth rib 65 extends straightly or substantially straightly and obliquely downward toward the front from a connection portion of the first rear portion 54 and the third rib 63 (lower end 54a) and is connected to the third front portion 53. The fifth rib 65 and the fourth rib 64 intersect with each other.

According to the above arrangement, a first structural body 71, having the upper end portion 41, the first rib 61, the second rib 62, the third rib 63, the first front portion 51, and the first rear portion 54, is arranged in the knuckle 19L. A second structural body 72, having the second front portion 52, the third front portion 53, the lower end portion 43, the third rear portion 56, the second rear portion 55, the fourth rib 64, and the fifth rib 65, is arranged in the knuckle 19L. The second structural body 72 is arranged at the lower portion of the first structural body 71.

Figure 8:
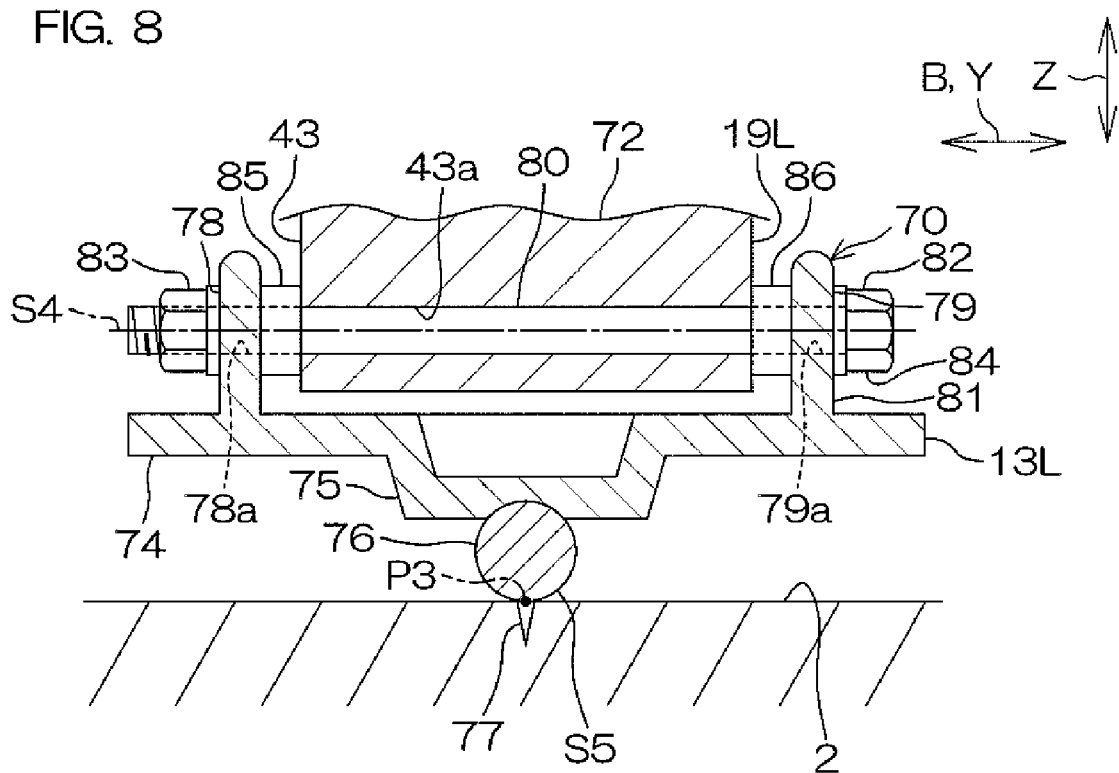
FIG. 8 is a schematic sectional view taken along line VIII-VIII in FIG. 7.

FIG. 8 is a schematic sectional view taken along line VIII-VIII in FIG. 7. The ski member 13L is preferably made of, for example, a synthetic resin. The ski member 13L includes a base 74, a keel 75 arranged to protrude downward from the base 74, a runner 76 fixed to the keel 75, and a tip 77 fixed to the runner 76. Although a state in which the runner 76 is received by the snow surface 2 is illustrated in the figure, the keel 75 and the base 74 are also arranged to be received by the snow surface 2.

The base 74 extends elongately with respect to the front/rear direction X and has a substantially fixed thickness. A substantially central portion of the base 74 with respect to the front/rear direction X is arranged at the lower portion of the lower end portion 43.

The keel 75 is arranged at an intermediate portion of the base 74 in a width direction B (right/left direction Y) of the ski member 13L and extends along the front/rear direction X along with the base 74.

The runner 76 is a member that is fixed to a lower end surface of the keel 75 and extends along the front/rear direction X along with the keel 75.

The tip 77 is preferably made of an ultra-hard material, etc., and preferably has a shape that is sharply pointed downward. The tip 77 is fixed to a lower end of the runner 76.

In the width direction B, centers of the keel 75 and the runner 76 are arranged at the center or substantially the center of the ski member 13L.

The ski member 13L and the knuckle 19L are coupled by a ski coupling unit 70. The ski coupling unit 70 includes a pair of side plates 78 and 79 that protrude upward from the base 74 of the ski member 13L, and a ski attachment member 81 that includes the pitching shaft 80.

The pair of side plates 78 and 79 are preferably integral with the base 74 and extend parallel or substantially parallel to each other across an interval in the width direction B. The lower end portion 43 of the knuckle 19L is arranged between the pair of side plates 78 and 79.

The ski attachment member 81 couples the ski member 13L and the knuckle 19L in a manner enabling relative rotation about a pitching axis S4, which is a central axis of the pitching shaft 80. The pitching axis S4 extends in the width direction B. The ski attachment member 81 includes a ski attachment bolt 82 that includes the pitching shaft 80, and a ski attachment nut 83.

The pitching shaft 80 is inserted through a screw insertion hole 78a formed in one side plate 78, the screw insertion hole 43a of the knuckle 19L, and a screw insertion hole 79a formed in the other side plate 79. The ski attachment nut 83 is threadedly engaged with a tip of the pitching shaft 80.

Collars 85 and 86 are attached to the pitching shaft 80. The collars 85 and 86 are arranged to adjust a position in the right/left direction of the ski member 13L with respect to the knuckle 19L. One collar 85 is arranged between one side plate 78 and the knuckle 19L. The other collar 86 is arranged between the other side plate 79 and the knuckle 19L.

By changing thicknesses of the respective collars 85 and 86, the position of the ski member 13L in the right/left direction Y with respect to the knuckle 19L can be changed.

A portion of the ski member 13L that is aligned vertically with the pitching axis S4 is a load center portion S5 that mainly receives a force from the snow surface 2 and the knuckle 19L. A center of the load center portion S5 in the width direction B of the ski member 13L is a load center point P3.

Referring to FIG. 7, swinging of the ski member 13L by no less than a predetermined amount about the pitching shaft 80 of the ski member 13L from the reference attitude is restricted by the second structural body 72 of the knuckle 19L.

Specifically, an outer side surface of the third front portion 53 of the second structural body 72 opposes the base 74. A stopper 58 is provided on the outer side surface. When a swinging amount of the ski member 13L from the reference position to one side (arrow C1 direction) about the pitching shaft 80 reaches the predetermined amount, the base 74 of the ski member 13L contacts the stopper 58 and the swinging of the ski member 13L is restricted.

An outer side surface of the portion at which the second rear portion 55 and the third rear portion 56 of the second structural body 72 are connected opposes the base 74 of the ski member 13L. A stopper 59 is provided on the outer side surface. When the swinging amount of the ski member 13L from the reference position to the other side (arrow C2 direction) about the pitching shaft 80 reaches the predetermined amount, the base 74 of the ski member 13L contacts the stopper 59 and the swinging of the ski member 13L is restricted.

The pitching shaft 80 is aligned with the third front portion 53 along the direction of extension of the third front portion 53 and is aligned with the third rear portion 56 along the direction of extension of the third rear portion 56. The pitching shaft 80 is aligned vertically or substantially vertically with an intersection portion 64a of the fourth rib 64 and the fifth rib 65. According to this arrangement, the knuckle 19L is increased in strength against a load acting from the pitching shaft 80 to the knuckle 19L.

With respect to the front/rear direction X, the pitching axis S4 is arranged between the lower end 51a of the first front portion 51 and the lower end 54a of the first rear portion 54. With respect to the front/rear direction X, the pitching axis S4 is arranged between the lower end 51a of the first front portion 51 and the upper support point P1. With respect to the front/rear direction X, the pitching axis S4 is arranged between the lower end 51a of the first front portion 51 and the lower support point P2.

By having the caster angle A1, the steering axis S3 is inclined with respect to the snow surface 2 such that a more frontwardly located portion of the steering axis is positioned at a lower portion. When a normal directed to the snow surface 2 (horizontal surface) from the lower support point P2 of the lower spherical joint 38 is defined as a reference normal S6, a horizontal distance (distance along the front/rear direction X) from the reference normal S6 to the steering axis S3 is longer at the lower portion.

Here, a horizontal distance from the pitching axis S4 to the steering axis S3 is defined as a kingpin offset L1. That is, the kingpin offset L1 refers to the distance from the pitching axis S4 to the steering axis S3 along the front/rear direction X.

A horizontal distance L2 from the pitching axis S4 to the reference normal S6 is shorter than the kingpin offset L1 (L2<L1). The kingpin offset L1 is thereby made to have an adequately large value.

More specifically, the caster angle A1 is preferably set, for example, to about 18° to about 23°, and the kingpin offset L1 is preferably set to an adequately large value of, for example, no less than about 31.5 mm. A displacement amount of the load center point P3 with respect to the right/left direction Y when the ski member 13L and the knuckle 19L are pivoted about the steering axis S3 from the straight drive state (during steering) can thereby be made large reliably. An upper limit of the kingpin offset L1 is set, for example, to approximately 60 mm in consideration of the layout of various parts and the turning performance of the snowmobile 1. The upper limit of the kingpin offset L1 may instead be preferably set to about 50 mm or to about 40 mm, for example.

An offset L3 is defined as a distance (shortest distance) between the pitching axis S4 and the steering axis S3. The offset L3 is preferably set to no less than about 30 mm, for example. By thus setting the offset L3 to an adequately large value, the displacement amount of the load center point P3 with respect to the right/left direction Y when the ski member 13L and the knuckle 19L are pivoted about the steering axis S3 from the straight drive state (during steering) can be made large reliably. A relationship, offset L3=kingpin offset L1×cos (caster angle A1), holds. When the caster angle A1 is about 18° to about 23°, the kingpin offset L1 with which the offset L3 is about 30 mm is approximately about 31.5 mm to 32.6 mm, for example. The kingpin offset L1 is thus preferably no less than about 31.5 mm as mentioned above.

An operation during turning of the snowmobile 1 shall now be described.

Figure 9:
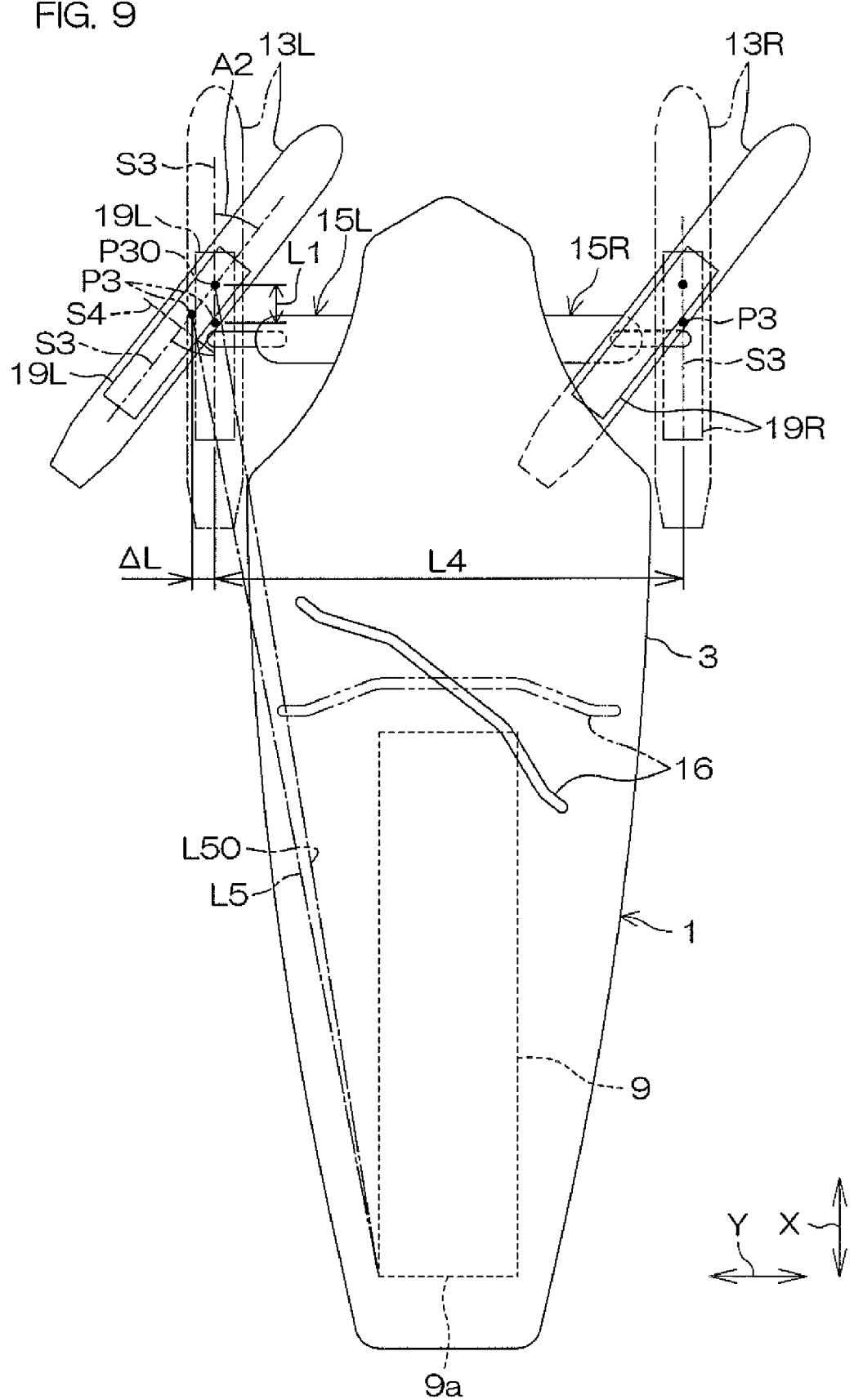
FIG. 9 is a schematic plan view of the snowmobile and shows an operation when the snowmobile is turning to the right (clockwise).

FIG. 9 is a schematic plan view of the snowmobile 1 and shows an operation when the snowmobile 1 is turning to the right (clockwise). When the snowmobile 1 is in the straight drive state, the pair of ski members 13R (indicated by alternate long and two short dashes lines) and 13L extend parallel or substantially parallel to the front/rear direction X.

When from the state where the snowmobile 1 is in the straight drive state, a driver pivots the handle 16 clockwise, the left side knuckle 19L and the right side knuckle 19R respectively pivot clockwise about the corresponding steering axes S3.

When the snowmobile 1 turns to the right, a larger load acts on the left side ski member 13L among the pair of ski members 13R and 13L. When the left side knuckle 19L and the ski member 13L are pivoted clockwise about the steering axis S3 from the straight drive state, the load center point P3 is displaced to the left side from the position in the straight drive state. A steering angle A2 from the straight drive state when the left side ski member 13L is pivoted clockwise maximally from the straight drive state (during maximum steering) preferably is, for example, approximately 38°.

Figure 10:
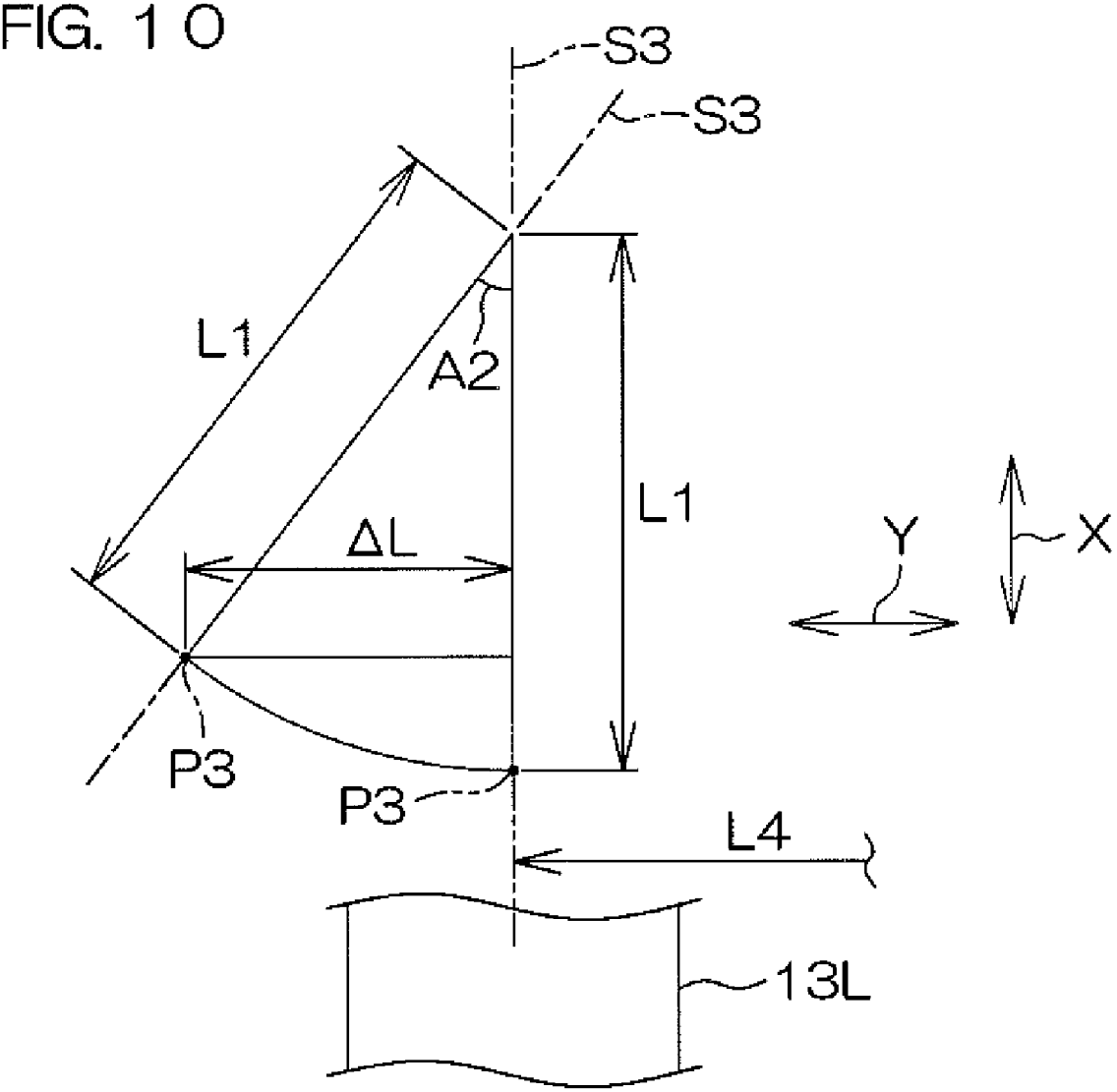
FIG. 10 is a schematic plan view for explaining an operation of a left side ski member.

As shown in the schematic views of FIG. 9 and FIG. 10, in this process, the load center point P3 is displaced to the left side (outer side of the turn) by just kingpin offset L1×sin 38°=ΔL. For example, when the kingpin offset L1 is about 31.5 mm, the load center point P3 is displaced to the left side by just ΔL=31.5×sin 38°≈19.4 mm, for example. A state equivalent to a stance L4, as a horizontal distance between the respective load center points P3 of the pair of ski members 13L and 13R, being widened by just ΔL×2=19.4×2=38.8 mm in comparison to the straight drive state is thereby attained. When the stance L4 in the maximum steering state is widened practically by no less than about 30 mm, for example, in comparison to the straight drive state, a driver with a keen sense can feel that the movement of the snowmobile 1 during turning is sportier.

Further, when the kingpin offset L1 is no less than about 32.5 mm, for example, the displacement is L1×sin 38°=20 mm, and a state equivalent to the stance L4 being widened by just ΔL×2=20×2=40 mm in comparison to the straight drive state is attained. When the stance L4 in the maximum steering state is thus widened practically by no less than about 40 mm, for example, in comparison to the straight drive state, even a driver who is not so keen can feel that the movement of the snowmobile 1 during turning is sportier.

For example, when the kingpin offset L1 is no less than about 41.3 mm, for example, the displacement is L1×sin 38°=25.4 mm, and a state equivalent to the stance L4 being widened by just ΔL×2=25.4×2=50 mm≈2 inches in comparison to the straight drive state is attained.

Referring to FIG. 9, when the snowmobile 1 is turning to the right at the maximum steering angle A2, the snowmobile 1 mainly receives the load at a left end of the rear end portion 9a of the track belt 9 and the load center point P3 of the left side ski member 13L. A line segment passing from the left end of the rear end portion 9a of the track belt 9 to the load center point P3 of the left side ski member 13L in plan view is defined as a line segment L5.

On the other hand, a line segment passing from the left end of the rear end portion 9a of the track belt 9 to the load center point P30 of the left side ski member 13L in a case where a kingpin offset L1 of zero is assumed is defined as a line segment L50. The load center point P30 practically does not change in position with respect to the right/left direction Y between the straight drive state and the steering state.

The line segment L5 is positioned more to the left side in comparison to the line segment L50. It can thus be understood that in the present preferred embodiment of the present invention in which the kingpin offset L1 is long, a maximum value of the load that the snowmobile 1 can receive during right turning is increased. Right turning of the snowmobile 1 can thus be performed in a sportier manner.

When the snowmobile 1 is turned to the left (counterclockwise), the snowmobile 1 mainly receives the load at a right end of the rear end portion 9a of the track belt 9 and the load center point P3 of the right side ski member 13R. A locus of movement of the load center point P3 of the right side ski member 13R when the snowmobile 1 turns to the left is right/left symmetrical to the locus of movement of the load center point P3 of the left side ski member 13L when the snowmobile 1 turns to the right. Left turning of the snowmobile 1 can thus be performed in a sportier manner.

As described above, according to the present preferred embodiment of the present invention, the horizontal distance L2 from the pitching axis S4 to the reference normal S6 in the reference attitude state is made shorter than the kingpin offset L1. The kingpin offset L1 can thereby be made longer. Thus, during travel of the snowmobile 1, a force tending to return the ski member 13L to the position in the straight travel state arises (a caster effect arises). Riding comfort of the snowmobile 1 during straight travel can thereby be enhanced. When the knuckle 19L and the ski member 13L at the left side are pivoted clockwise from the straight drive state to perform right turning, the movement amount of the load center point P3 to the left side (outer side of the turn) can be made adequately large.

The position of the load center point P3 of the ski member 13L that is positioned at the outer side of the right turn is thus positioned, during the turning of the snowmobile 1, at a more outwardly located point of the turn in comparison to the straight drive state.

The ski member 13L can consequently receive a load at the more outwardly located point of the turn, and the movement of the snowmobile 1 during turning can thus be made sportier. The fun of driving the snowmobile 1 can thus be enhanced because the riding comfort of the snowmobile 1 during straight travel can be enhanced and yet the movement of the snowmobile 1 during turning can be made sportier.

Moreover, in addition to elongating the kingpin offset L1, the horizontal distance L2 from the reference normal S6 to the pitching axis S4 is made shorter than the kingpin offset L1. Further, the offset L3 preferably is no less than about 30 mm, for example. The distance with respect to the front/rear direction X between the load center point P3 of the ski member 13L and the lower support point P2 can thus be shortened. Thus, a moment acting about the lower support point P2 when the load from the snow surface 2 acts upward to the load center point P3 can be lessened. A bending moment that acts on the knuckle 19L can thus be lessened, and the loads applied to the knuckle 19L, the upper arm 20 and the lower arm 21 that support the knuckle 19L, etc., and especially the load applied to the lower arm 21 can be lessened. An excellent effect of reduction in the loads applied to the knuckle 19L, the upper arm 20 and the lower arm 21 arranged to support the knuckle 19L, etc., which tend to increase in load as the turning performance is enhanced, can thereby be provided.

Thus, during the right turning of the snowmobile 1, the position of the load center point P3 in the ski member 13L at the outer side of the turn that receives a larger force than in the ski member 13R at the inner side of the turn can be moved by a large amount toward the outer side of the turn in comparison to during straight travel. The riding comfort of the snowmobile 1 during straight travel can thus be enhanced and yet the movement of the snowmobile 1 during turning can be made sportier.

By making the offset L3 no less than about 30 mm, for example, the pitching axis S4 can be disposed adequately far from the steering axis S3. Thus, when the knuckle 19L and the ski member 13L are pivoted clockwise (during right turning), the movement amount of the load center point P3 to the left side, which is the outer side of the turn, can be made adequately large.

Consequently, the riding comfort of the snowmobile 1 during straight travel can be enhanced and yet the movement of the snowmobile 1 during turning can be made sportier. Moreover, by making the offset L3 no less than about 30 mm, for example, practically any driver can be made to feel good riding comfort during straight travel and feel that movement during turning of the snowmobile 1 is sporty.

The knuckle 19L is supported on the upper arm 20 at the upper support point P1, and is supported on the lower arm 21 at the lower support point P2. According to this arrangement, the knuckle 19L can be supported by the pair of the upper and lower arms 20 and 21. A load acting from the knuckle 19L can be received reliably by the lower arm 21.

Further, the knuckle 19L is coupled to the upper arm 20 via the upper spherical joint 37 at the upper support point P1, and is coupled to the lower arm 21 via the lower spherical joint 38 at the lower support point P2. The knuckle 19L can thereby be coupled to the pair of upper and lower arms 20 and 21 by the pair of upper and lower spherical joints 37 and 38.

The rear portion forming member 44 is provided in the first structural body 71 of the knuckle 19L. The first rear portion 51 of the knuckle 19L thus serves as a pillar that receives the load from the ski member 13L. Thus, even when the ski member 13L receives a large force from the snow surface 2, the large force can be received firmly by the rear portion forming member 44.

Further, with respect to the front/rear direction X, the pitching axis S4 is arranged between the lower end 51a of the first front portion 51 and the lower end 54a of the first rear portion 54. The first front portion 51 and the first rear portion 54 of the knuckle 19L thus serve as two pillars that receive the load from the ski member 13L. Thus, even when the ski member 13L receives a large force from the snow surface 2, the large force can be received firmly by the two pillars.

With respect to the front/rear direction X, the pitching axis S4 is arranged between the lower end 51a of the first front portion 51 and the lower support point P2. The load from the pitching axis S4 (load center point P3) can thereby be received reliably by the first front portion 51.

Further, the pitching shaft 80 is coupled to the second structural body 72 of the knuckle 19L. The knuckle 19L and the pair of upper and lower arms 20 and 21 can thereby be coupled firmly by the coupling of the first structural body 71 of the knuckle 19L and the pair of upper and lower spherical joints 37 and 38. The second structural body 72 and the ski member 13L can be coupled by the coupling of the second structural body 72 and the pitching shaft 80. By the first structural body 71 and the second structural body 72 being integral with each other, the strength of the knuckle 19L can be increased further.

The second structural body 72 includes stoppers 58 and 59 to restrict the swinging of the ski member 13L about the pitching axis S4. The ski member 13L can thereby be prevented from swinging more than necessary about the pitching axis.

The pitching shaft 80 is arranged at the lower end portion 43 of the knuckle 19L at the lower portion relative to the pair of upper and lower arms 20 and 21. The load at the lower end portion 43 of the knuckle 19L thus becomes large in comparison to the upper end portion 41 of the knuckle 19L and bias of the load inside the knuckle 19L tends to be large.

On the other hand, in a four-wheeled motor vehicle or a two-wheeled motor vehicle having wheels instead of ski members, an axle, corresponding to the pitching shaft, is arranged between a pair of upper and lower arms. That is, the axle is arranged at a center or substantially a center in an up/down direction of a knuckle. A bias between a load acting on an upper end portion of the knuckle and a load acting on a lower end portion is thus low.

According to the snowmobile 1, the bias of the load inside the knuckle 19L tends to be large, and a bias in load balance occurs readily. However, occurrence of bias between the load acting on the upper end portion 41 of the knuckle 19L and the load acting on the lower end portion 43 can be prevented because the load center point P3 is brought close to the upper end portion 41 side in the front/rear direction X by making the kingpin offset L1 large. The load balance in the knuckle 19L can thus be made more uniform even in the snowmobile 1, which, unlike a four-wheeled motor vehicle or a two-wheeled motor vehicle, etc., has a unique arrangement in which bias occurs readily in the load balance.

Second Preferred Embodiment

Figure 11:
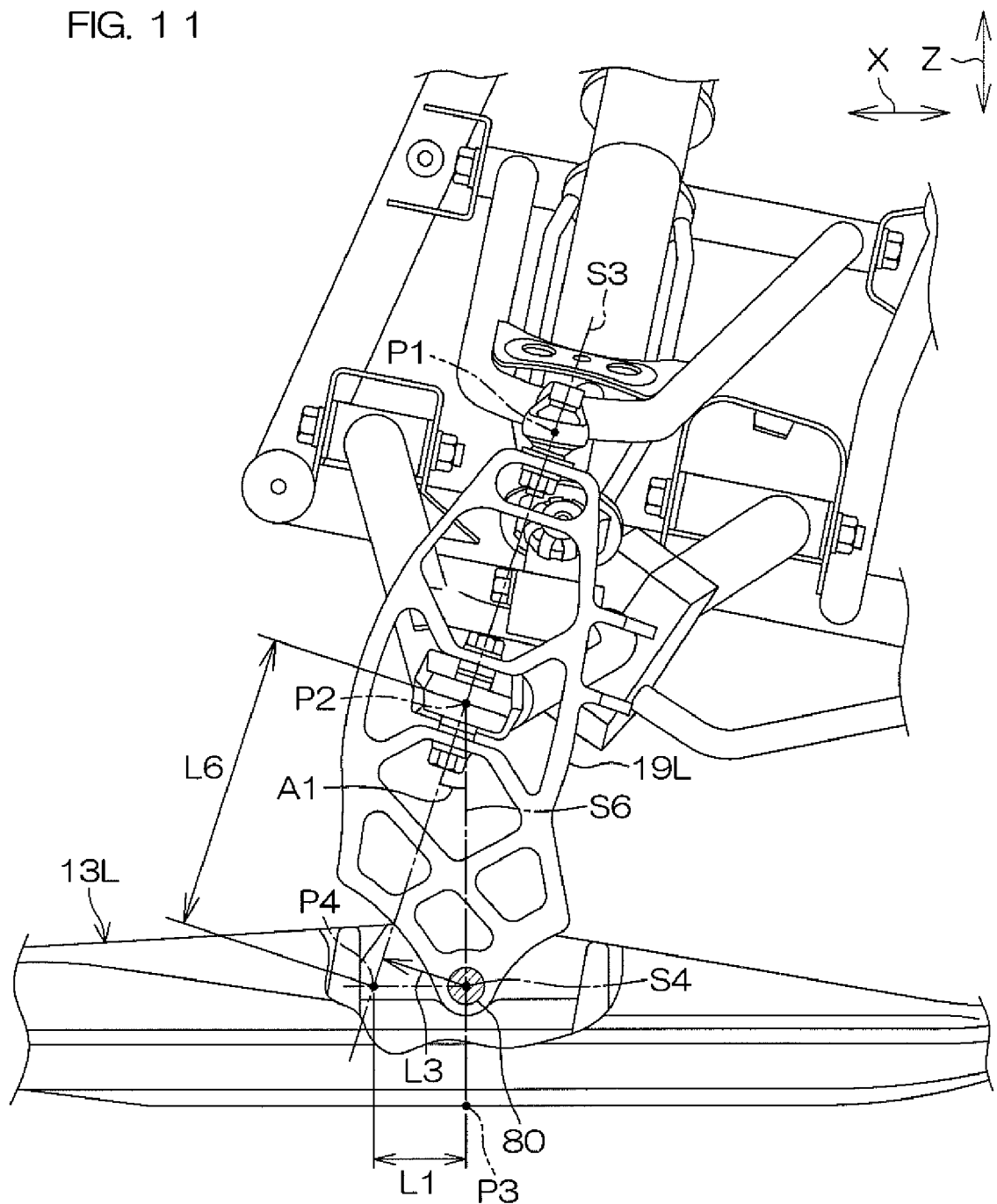
FIG. 11 is a left side view of principal portions of a second preferred embodiment of the present invention.

FIG. 11 is a left side view of principal portions of a second preferred embodiment of the present invention. In the following description, points that differ from the first preferred embodiment of the present invention shall be described. With the second preferred embodiment of the present invention, arrangements that are the same as those of the first preferred embodiment shall be provided with the same symbols and description thereof shall be omitted.

In the present preferred embodiment of the present invention, the pitching axis S4 is arranged so as to pass through the reference normal S6.

A distance to the lower support point P2 from an intersection P4 of the steering axis S3 with a horizontal line passing through the pitching axis S4 is defined as a distance L6.

Here, the caster angle A1 preferably is, for example, about 18° to about 23°. The distance L6 preferably is, for example, about 100 mm to about 160 mm.

A lower limit of the kingpin offset L1 is thus 100×sin 18°=30.9 mm≈30 mm, and the offset L3 in this case is 30.9×cos 18°=29.4 mm≈30 mm, for example.

An upper limit of the kingpin offset L1 is 160×sin 23°=62.5 mm≈63 mm, and the offset L3 in this case is 62.5×cos 23°=57.5 mm≈60 mm, for example.

The kingpin offset L1 is thus preferably set in a range of about 30 mm to about 63 mm, for example. The offset L3 is set in a range of about 30 mm to about 60 mm, for example.

In the present preferred embodiment of the present invention, the pitching axis S4 is arranged so as to pass through the reference normal S6. The pitching axis S4 can thus be arranged adequately far from the steering axis S3. The moment acting about the lower support point P2 when the load from the snow surface 2 acts upward to the load center point P3 can be made equal to zero. The bending moment acting on the knuckle 19L can thus be made extremely small, and the loads applied to the knuckle 19L, the upper arm 20 and the lower arm 21 that support the knuckle 19L, etc., and especially the load applied to the lower arm 21 can be lessened.

Third Preferred Embodiment

Figure 12:
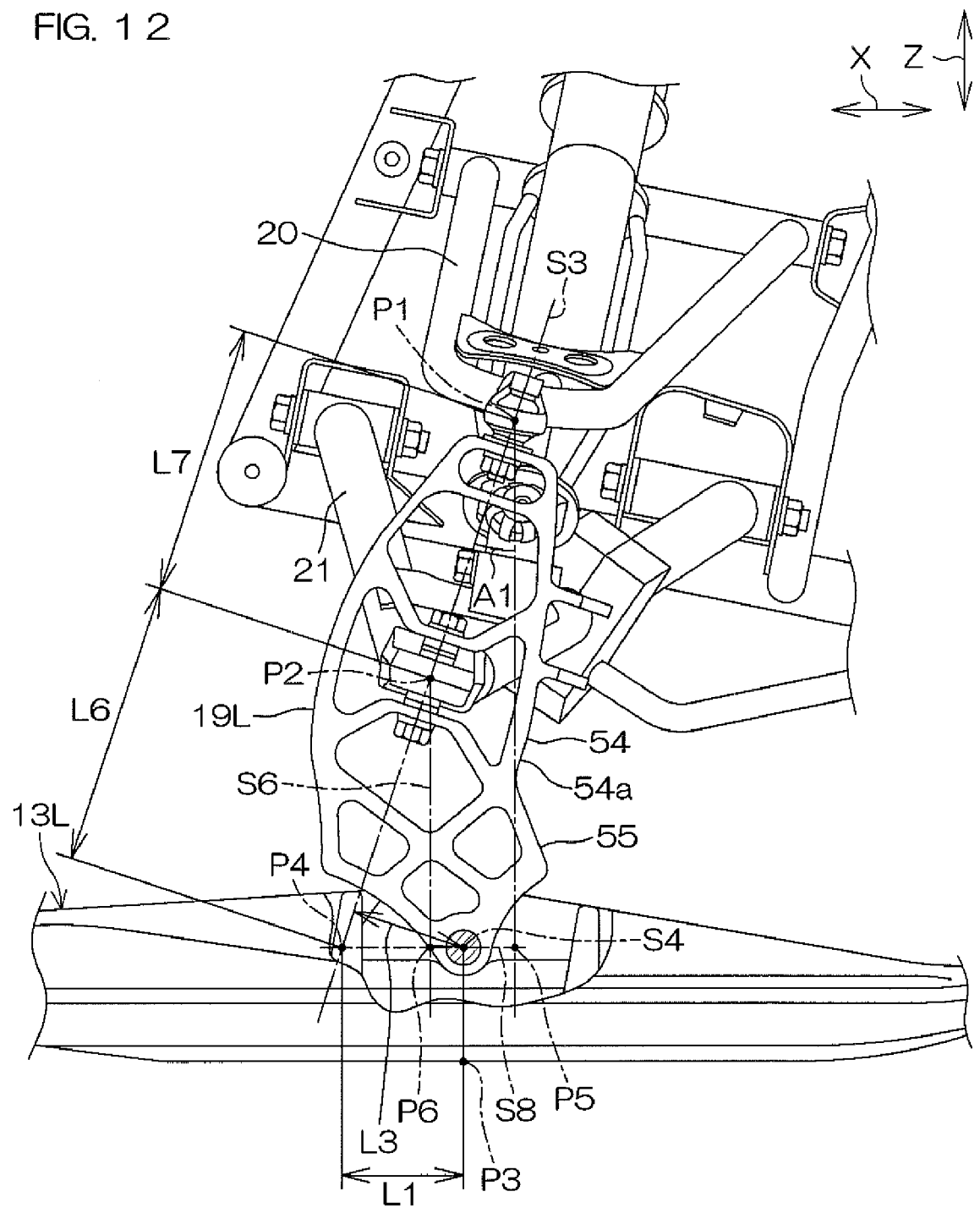
FIG. 12 is a left side view of principal portions of a third preferred embodiment of the present invention.

FIG. 12 is a left side view of principal portions of a third preferred embodiment of the present invention. In the following description, points that differ from the second preferred embodiment of the present invention shall be described. With the third preferred embodiment of the present invention, arrangements that are the same as those of the second preferred embodiment of the present invention shall be provided with the same symbols and description thereof shall be omitted.

In the third preferred embodiment of the present invention, with respect to the front/rear direction X, the pitching axis S4 is arranged between the upper support point P1 and the lower support point P2. With respect to the front/rear direction X, the pitching axis S4 is arranged between the lower support point P2 and the lower end 54a of the first rear portion 54.

More specifically, first, an intersection of a normal passing through the upper support point P1 and a horizontal line passing through the pitching axis S4 is referred to as a point P5. An intersection of the reference normal S6 and the horizontal line passing through the pitching axis S4 is referred to as a point P6. A line segment between the point P5 and the point P6 is defined as a line segment S8. The pitching axis S4 is arranged on the line segment S8.

Within the steering axis S3, a distance between the upper support point P1 and the lower support point P2 is defined as a distance L7. The distance L7 is set to the same or substantially the same length as the distance L6.

The lower limit of the kingpin offset L1 is the length between the points P4 and P6, and the upper limit is the length between the point P4 and the point P5. Specifically, the lower limit of the kingpin offset L1 preferably is the length between the point P4 and the point P6 when the caster angle A is small, that is, $100 \times \sin 18° = 30.9$ mm≈30 mm, and the offset L3 in this case is $30.9 \times \cos 18° = 29.4$ mm≈30 mm, for example.

The upper limit of the kingpin offset L1 preferably is the length between the point P4 and point P5 when the caster angle A1 is large, that is, (distance L6+L7)$\times \sin 23° = (160+160) \times \sin 23° = 125$ mm, for example. However, in actuality, the upper limit of the kingpin offset L1 preferably is set to about 60 mm, for example, in consideration of various design conditions. The offset L3 in this case is $60 \times \cos 23° = 55.2$ mm≈56 mm.

The kingpin offset L1 is thus preferably set in a range of about 30 mm to about 60 mm, for example. The offset L3 is preferably set in a range of about 30 mm to about 56 mm, for example. The upper limit of the kingpin offset L1 may instead preferably be set to about 50 mm or to about 40 mm, for example.

According to the present preferred embodiment of the present invention, with respect to the front/rear direction X, the pitching axis S4 is arranged between the upper support point P1 and the lower support point P2. A load from the load center point P3 of the ski member 13L can thereby be received by both the upper arm 20 and the lower arm 21. The load from the ski member 13L and the knuckle 19L can thus be received in a well-balanced manner by the pair of upper and lower arms 20 and 21. Consequently, a support rigidity of the knuckle 19L can be increased.

With respect to the front/rear direction X, the pitching axis S4 is arranged between the lower support point P2 and the lower end 54a of the first rear portion 54. The load from the load center point P3 can thereby be received reliably by the first rear portion 54 while positioning the pitching axis S4 (load center point P3) adequately to the rear with respect to the steering axis S3.

Fourth Preferred Embodiment

Figure 13:
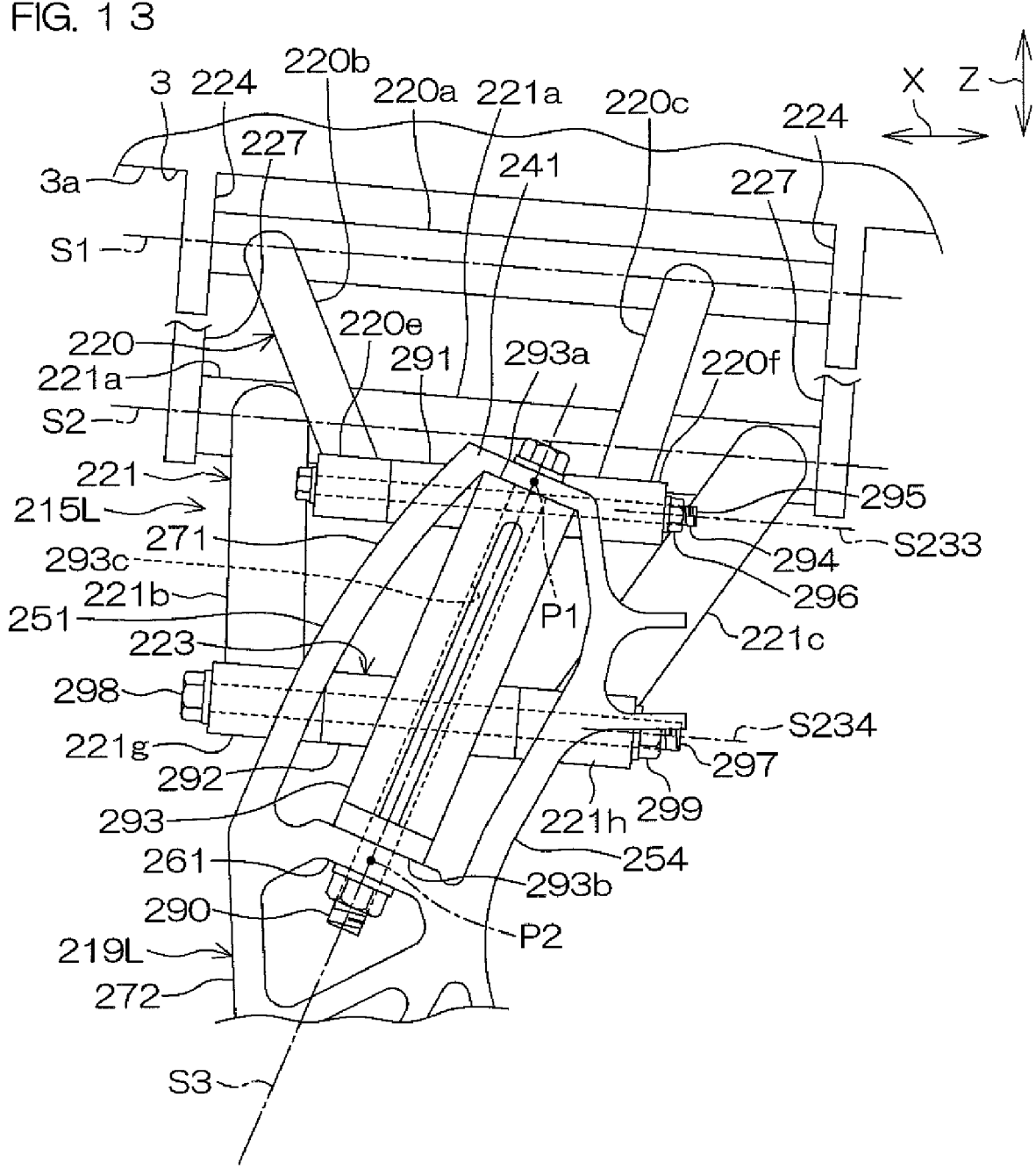
FIG. 13 is a partial sectional view of principal portions of a left side suspension device of a fourth preferred embodiment of the present invention.

FIG. 13 is a partial sectional view of principal portions of a left side suspension device 215L of a fourth preferred embodiment of the present invention.

With the fourth preferred embodiment of the present invention, arrangements that are the same as those of the first preferred embodiment of the present invention shall be provided with the same symbols and description thereof shall be omitted.

The present preferred embodiment of the present invention differs from the first preferred embodiment of the present invention in an arrangement of the front suspension device 215L. The front suspension device 215L at the left side and a front suspension device at the right side are arranged in a right/left symmetrical manner. Thus, in the following description, the front suspension device 215L at the left side shall be described mainly, and description of the front suspension device at the right side shall be omitted.

Referring to FIG. 13, in the present preferred embodiment of the present invention, a steering shaft 290 is provided as a member that defines the steering axis S3, and the steering shaft 290 is supported by a coupling unit 223 and a knuckle 219L.

The front suspension device 215L preferably is, for example, a double wishbone type suspension device. The front suspension device 215L includes a pair of upper and lower arms 220 and 221, a cushioning member 22 (not shown in FIG. 13), the knuckle 219L, and the coupling unit 223 arranged to couple the pair of upper and lower arms 220 and 221 to the knuckle 219L.

The upper arm 220 preferably has a substantially A-shaped configuration. The upper arm 220 includes a cylindrical base end portion 220a arranged to extend with respect to the front/rear direction X, a front arm 220b arranged to extend to the left side from a front end of the base end portion 220a, and a rear arm 220c arranged to extend to the left side from a rear end of the base end portion 220a. The base end portion 220a is arranged at the left side of the front portion 3a of the vehicle body 3.

The base end portion 220a is sandwiched by a pair of front and rear brackets 224 provided on the front portion 3a of the vehicle body 3.

An unillustrated attachment bolt that penetrates through the base end portion 220a and the pair of brackets 224 is provided, and the base end portion 220a is coupled to the pair of brackets 224 by using this attachment bolt. The base end portion 220a (upper arm 220) is thereby enabled to swing about the first swinging axis S1.

A mutual interval between the front arm 220b and the rear arm 220c narrows with increasing distance away toward the left side from the vehicle body 3. Tips of the front arm 220b and the rear arm 220c are aligned across an interval with respect to the front/rear direction X. Cylindrical portions 220e and 220f are arranged respectively at the tip of the front arm 220b and the tip of the rear arm 220c. The cylindrical portions 220e and 220f are aligned with respect to the front/rear direction X.

The lower arm 221 is an example of an "arm member" according to a preferred embodiment of the present invention. The lower arm 221 preferably has a substantially A-shaped configuration as a whole and is arranged at a lower portion of the upper arm 220.

The lower arm 221 preferably has a substantially A-shaped configuration. The lower arm 221 includes a cylindrical base end portion 221a arranged to extend in the front/rear direction X, a front arm 221b arranged to extend to the left side from a front end of the base end portion 221a, and a rear arm 221c arranged to extend to the left side from a rear end of the base end portion 221a.

The base end portion 221a is sandwiched from the front and rear by a pair of front and rear brackets 227 provided on the front portion 3a of the vehicle body 3.

An unillustrated attachment bolt that penetrates through the base end portion 221a and the pair of brackets 227 is provided, and the base end portion 221a is coupled to the pair of brackets 227 by using this attachment bolt. The base end portion 221a (lower arm 221) is thereby enabled to swing about the second swinging axis S2.

A mutual interval between the front arm 221b and the rear arm 221c narrows with distance away to the left side from the vehicle body 3. Tips of the front arm 221b and the rear arm 221c are aligned across an interval with respect to the front/rear direction X. Cylindrical portions 221g and 221h are arranged respectively at the tip of the front arm 221b and the tip of the rear arm 221c. The cylindrical portions 221g and 221h are aligned with respect to the front/rear direction X.

Figure 14:
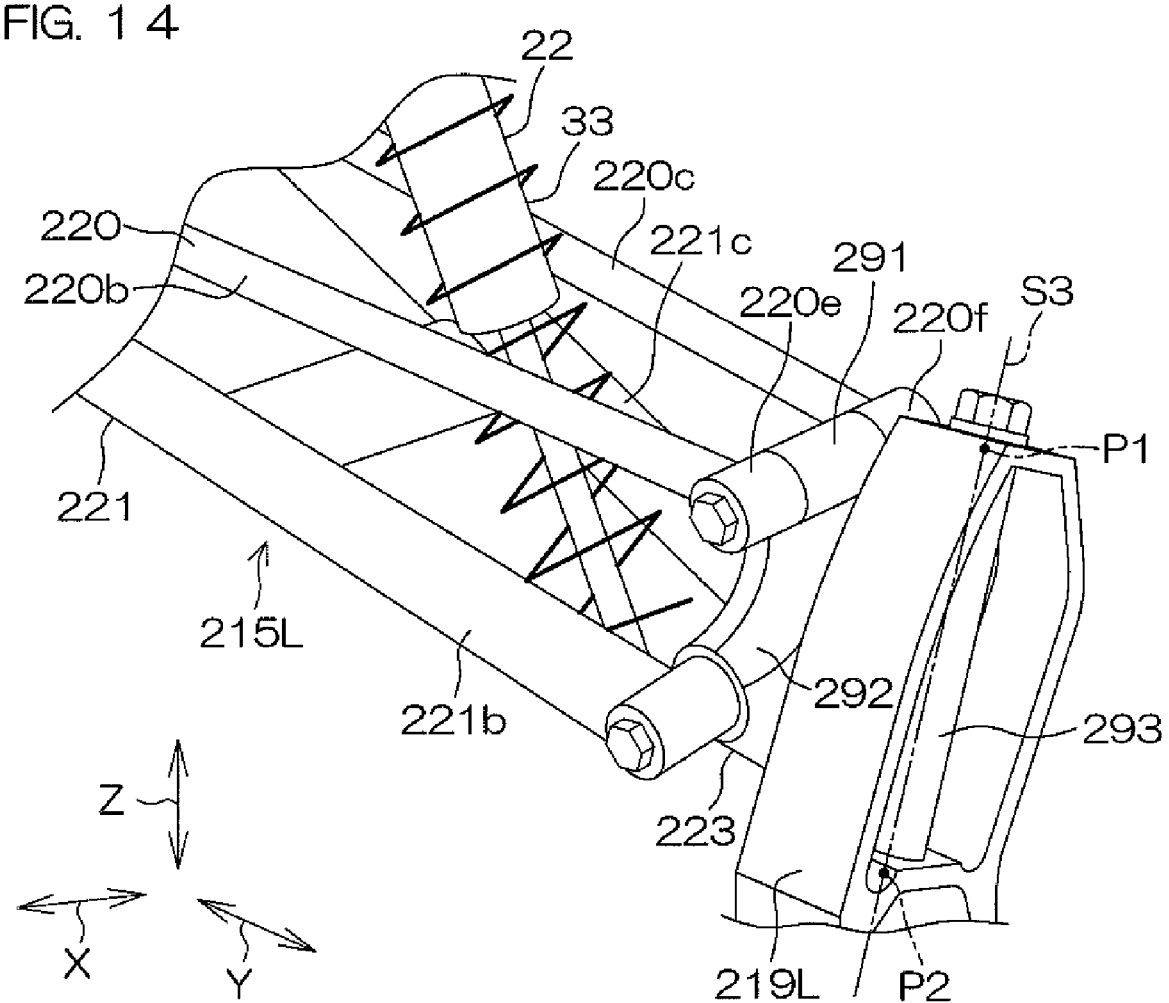
FIG. 14 is a perspective view of principal portions of the suspension device as viewed from a left upper front.

FIG. 14 is a perspective view of principal portions of the suspension device 215L as viewed from a left upper front. The cushioning member 22 is arranged between the lower arm 21 and the vehicle body 3 and passes between the front arm 220b and the rear arm 220c of the upper arm 220. The lower end portion of the hydraulic damper 33 of the cushioning member 22 is attached to the front arm 221b of the lower arm 221 using an unillustrated bolt, and is rotatable relative to the lower arm 21 about an axis arranged to extend in the front/rear direction.

The coupling unit 223 couples the knuckle 219L to the upper arm 220 and the lower arm 221 in a manner enabling relative rotation about the steering axis S3. The coupling unit 223 is preferably an integrally molded article made of metal and formed by forging, for example.

The coupling unit 223 includes first coupling portion 291 coupled to the upper arm 220, a second coupling portion 292 coupled to the lower arm 221, and a third coupling portion 293 coupled to the knuckle 219L in a manner enabling relative rotation about the steering axis S3.

The first coupling portion 291 is arranged between the cylindrical portions 220e and 220f of the upper arm 220. An insertion hole (not shown) that is in communication with the cylindrical portions 220e and 220f is provided in the first coupling portion 291. Referring to FIG. 13, an attachment bolt 295, having an upper support shaft 294 that is inserted through the front cylindrical portion 220e, the insertion hole of the first coupling portion 291, and the rear cylindrical portion 220f, is provided. The upper support shaft 294 extends in the front/rear direction X. An attachment nut 296 is threadedly engaged with a tip (rear end) of the upper support shaft 294. The first coupling portion 291 and the upper arm 220 are thereby coupled in a manner enabling relative rotation about a third swinging axis S233 arranged to extend with respect to the front/rear direction X. The third swinging axis S233 is parallel or substantially parallel to the first swinging axis S1.

The second coupling portion 292 is arranged at the lower portion of the first coupling portion 291. The second coupling portion 292 is arranged between the cylindrical portions 221g and 220h of the lower arm 221 and an insertion hole (not shown) that is in communication with the cylindrical portions 221g and 221h is provided in the second coupling portion 292. An attachment bolt 298, having a lower support shaft 297 that is inserted through the front cylindrical portion 221g, the insertion hole of the second coupling portion 292, and the rear cylindrical portion 221h, is provided. The lower support shaft 297 extends with respect to the front/rear direction X. An attachment nut 299 is threadedly engaged with a tip (rear end) of the attachment bolt 298.

The second coupling portion 292 and the lower arm 221 are thereby coupled in a manner enabling relative rotation about a fourth swinging axis S234 arranged to extend in the front/rear direction X. The fourth swinging axis S234 is parallel or substantially parallel to the third swinging axis S233.

The third coupling portion 293 preferably has a tubular form and is arranged at the left side of the first coupling portion 291 and the second coupling portion 292. An upper end surface 293a and a lower end surface 293b of the third coupling portion 293 are orthogonal or substantially orthogonal to the steering axis S3. A steering shaft insertion hole 293c is arranged to penetrate through the third coupling portion 293. A central axis of the steering shaft insertion hole 293c is matched with the steering axis S3.

The knuckle 219L is capable of swinging about the steering axis S3 with respect to the third coupling portion 293 of the coupling unit 223. The knuckle 219L is supported on the upper arm 220 at the upper support point P1 and is supported on the lower arm 221 at the lower support point P2 as the predetermined support point. The lower support point P2 is arranged at the lower portion of the upper support point P1.

Figure 15:
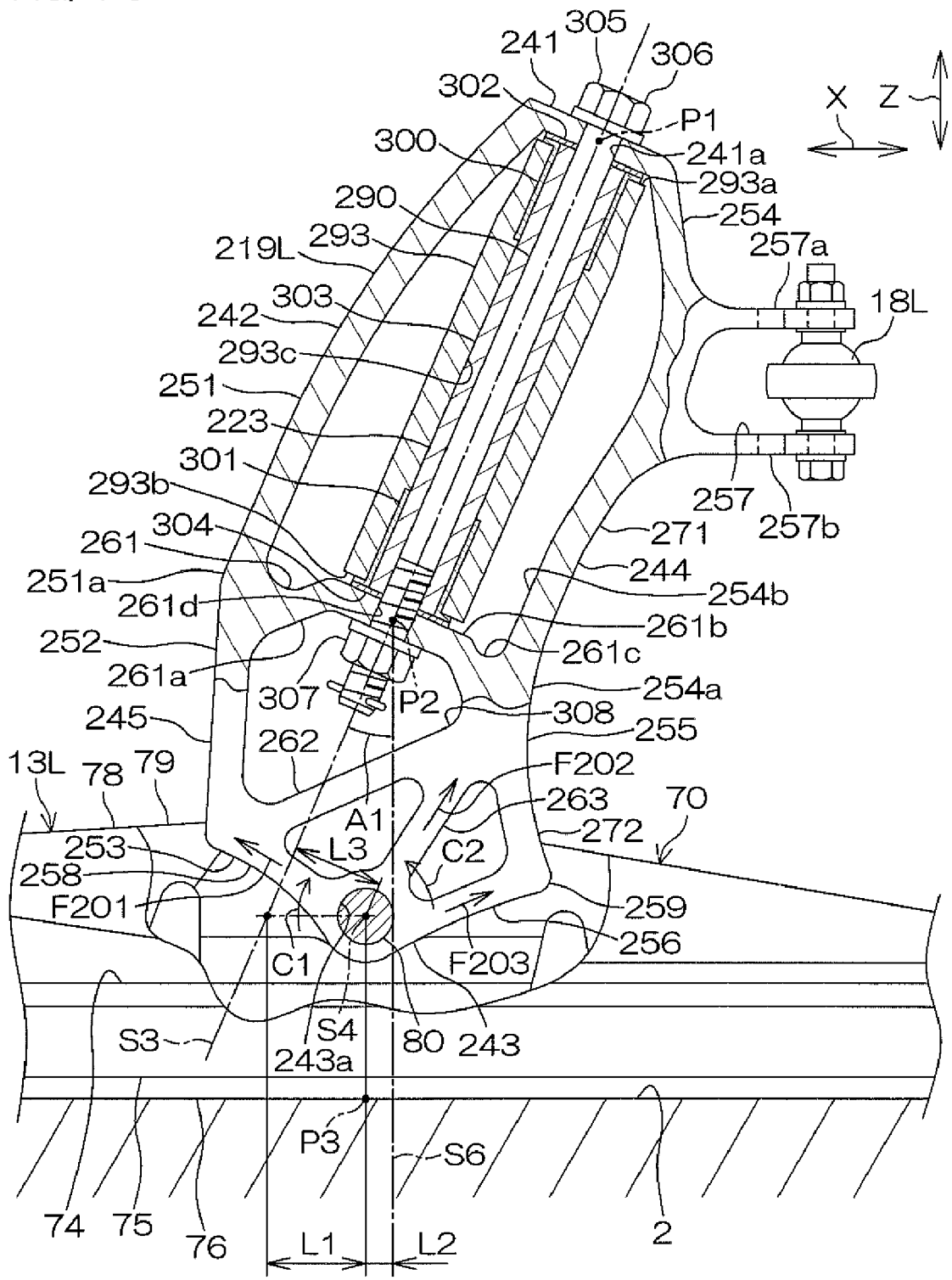
FIG. 15 is a left side view showing a portion of a vicinity of a knuckle in section.

FIG. 15 is a left side view showing a portion of a vicinity of the knuckle 219L in section. The knuckle 219L preferably is an integrally molded article formed by extrusion molding, for example, and preferably has an annular form as a whole. The knuckle 219L includes a first structural body 271, and a second structural body 272 arranged at the lower portion of the first structural body 271.

The knuckle 219L also includes an annular portion 245 having an upper end portion 241, a front portion forming member 242, a lower end portion 243, and a rear portion forming member 244.

In side view, the upper end portion 241 extends obliquely downward toward the rear and is arranged at the upper portion of the third coupling portion 293. The upper support point P1 is arranged inside the upper end portion 241.

Referring to FIG. 14, the knuckle 219L is coupled to the first coupling portion 291 with the upper support point P1 as a center. The knuckle 219L is supported on the upper arm 220 with the upper support point P1 as the center.

Referring to FIG. 15, the front portion forming member 242 is arranged at the front of the third coupling portion 293. The front portion forming member 242 includes a first front portion 251, a second front portion 252, and a third front portion 253 that are aligned in that order from the upper portion.

The first front portion 251 is an example of the "front side portion" according to a preferred embodiment of the present invention, and is arranged at the front of the third coupling portion 293. The first front portion 251 preferably has a curved shape that is convex toward the front. The first front portion 251 extends obliquely downward toward the front from the front end of the upper end portion 241 and a lower end 251a protrudes forward the most. The first front portion 251 is arranged to extend across to the lower support point P2 from the upper support point P1.

The second front portion 252 preferably has a rectilinear or a substantially rectilinear form and extends downward from the lower end 251a of the first front portion 251.

The third front portion 253 preferably has a curved shape that is convex obliquely upward toward the rear, and extends downward from a lower end of the second front portion 252. The third front portion 253 extends obliquely downward toward the rear from the lower end of the second front portion 252. The third front portion 253 and the steering axis S3 intersect with each other.

The lower end portion 243 is connected to a rear end of the third front portion 253 and preferably has a circular shape. An insertion hole 243a, through which the pitching shaft 80 is inserted, is formed in the lower end portion 243. The insertion hole 243a penetrates through the lower end portion 243 along a thickness direction of the knuckle 219L.

The rear portion forming member 244 is arranged at the rear of the upper support point P1 and the lower support point P2. The rear portion forming member 244 includes a first rear portion 254, a second rear portion 255, and a third rear portion 256 that are aligned in that order from the upper portion.

The first rear portion 254 is an example of the "rear portion" according to a preferred embodiment of the present invention, and is arranged at the rear of the third coupling portion 293. The first rear portion 254 preferably has a shape that is convex toward the rear. The first rear portion 254 extends downward from the rear end of the upper end portion 241, and an intermediate portion of the first rear portion 254 in the up/down direction Z protrudes rearward the most.

The first rear portion 254 is arranged to extend across from the upper support point P1 to the lower support point P2. The third coupling portion 293, the upper support point P1, and the lower support point P2 are arranged between the first rear portion 254 and the first front portion 251.

A portion at a lower end 254a side of the first rear portion 254 is arranged as a parallel portion 254b that extends parallel or substantially parallel to the steering axis S3.

A bracket 257, to which the tie rod 18L is coupled, protrudes toward the rear from an outer side surface (rear surface) of the first rear portion 254. The bracket 257 includes a pair of stays 257a and 257b that are aligned vertically. The left side tie rod 18L is attached between the stays 257a and 257b. The bracket 257 is thereby displaced in the right/left direction Y in accompaniment with the displacement of the tie rod 18L in the right/left direction Y, and consequently, the knuckle 219L pivots around the steering axis S3.

The second rear portion 255 extends downward from the lower end 254a of the first rear portion 254, and preferably has a curved shape that is convex toward the front. The second rear portion 255 is arranged at the rear of the third front portion 253. The second rear portion 255 and the third coupling portion 293 are aligned vertically.

The third rear portion 256 extends rectilinearly or substantially rectilinearly and obliquely downward toward the front from the lower end of the second rear portion 255 to the lower end portion 243.

Inside the annular portion 245 of the knuckle 219L, a first rib 261, a second rib 262, and a third rib 263 are arranged in that order from the upper portion. The annular portion 245 is reinforced by the first to third ribs 261 to 263.

The first rib 261 is arranged between the first front portion 251 and the first rear portion 254. The first rib 261 includes a front portion 261a, an intermediate portion 261b, and a rear portion 261c.

The front portion 261a has a front end connected to the lower end 251a of the first front portion 251 and extends obliquely upward toward the rear. The intermediate portion 261b extends rearward from a rear end of the front portion 261a and is parallel or substantially parallel to the upper end portion 241. The rear portion 261c extends obliquely downward toward the rear from a rear end of the intermediate portion 261b and is connected to the lower end 254a of the first rear portion 254.

The first rib 261 and the upper end portion 241 of the knuckle 219L are coupled to the third coupling portion 293. Specifically, the steering shaft 290 inserted through the steering shaft insertion hole 293c of the third coupling portion 293, a pair of upper and lower bushings 300 and 301 through which the steering shaft 290 is inserted, and three collars 302, 303, and 304 through which the steering shaft 290 is inserted, are included.

An insertion hole 241a is formed in the upper end portion 241 of the knuckle 219L, and an insertion hole 261d is formed in the intermediate portion 261b of the first rib 261. The steering shaft 290 is inserted through the insertion hole 241a, the steering shaft insertion hole 293c, and the insertion hole 261d.

The steering axis S3 as a central axis of the steering shaft 290 extends obliquely upward toward the rear from the snow surface 2. The caster angle A1 is provided as an inclination angle of the steering axis S3 with respect to the snow surface 2 (vertical line). The caster angle A1 preferably is about 18° to about 23°, for example.

A head portion 305 is integral with an upper end of the steering shaft 290. A bolt 306 is defined by the steering shaft 290 and the head portion 305. The head portion 305 is received by an upper surface of the upper end portion 241.

Figure 16:
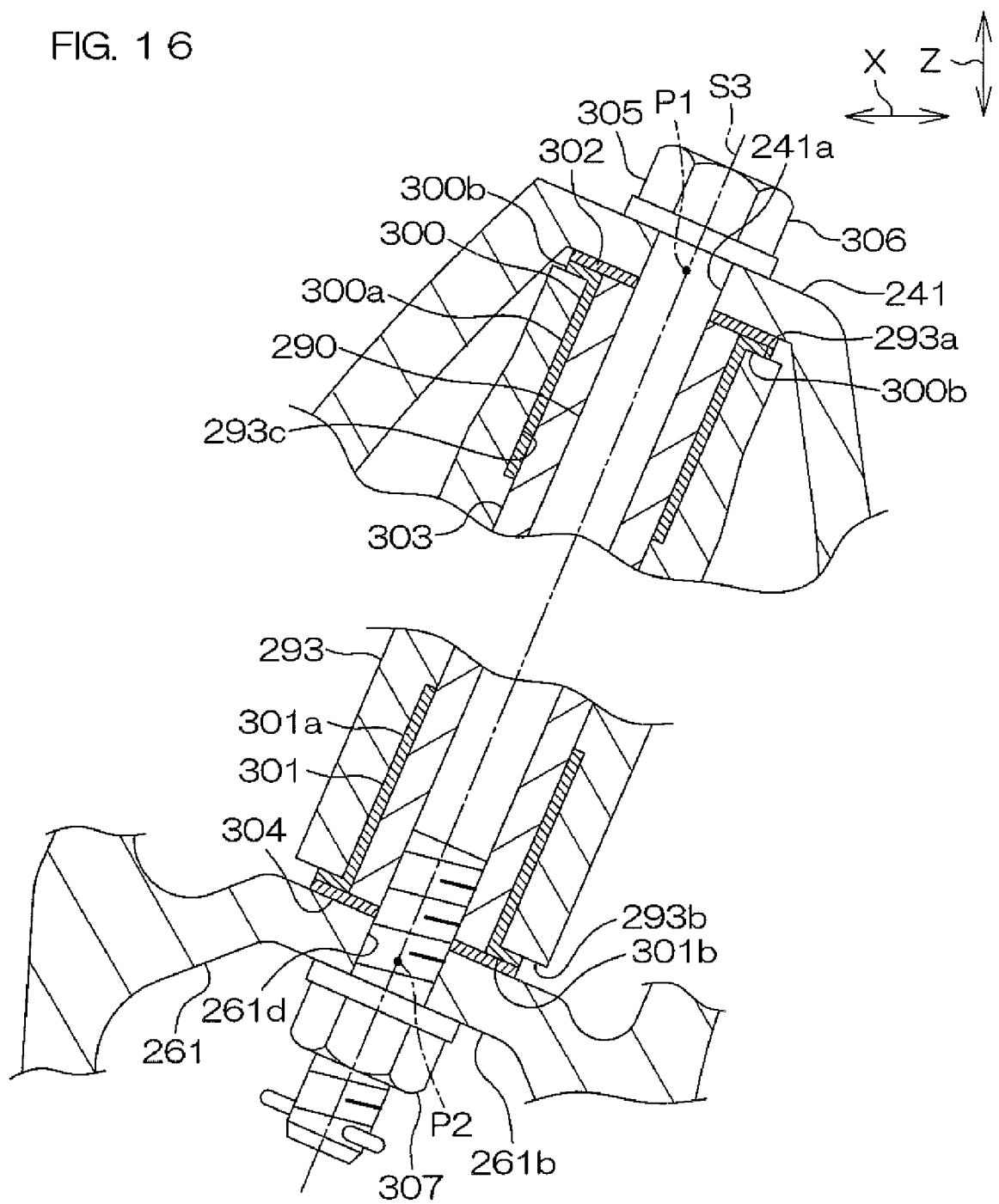
FIG. 16 is an enlarged view of a vicinity of an upper end surface and a vicinity of a lower end surface of a third coupling portion of FIG. 15.

FIG. 16 is an enlarged view of a vicinity of the upper end surface 293a and a vicinity of the lower end surface 293b of the third coupling portion 293 of FIG. 15. The collar 303 preferably has an elongated, tubular form and the intermediate portion of the steering shaft 290 is inserted through the collar 303. The collar 302 is preferably a thin, annular plate and is arranged between an upper end surface of the collar 303 and a lower end surface of the upper end portion 241. The collar 304 is preferably a thin, annular plate and is arranged between a lower end surface of the collar 303 and an upper end surface of the first rib 261.

The upper bush 300 includes a cylindrical portion 300a fixed to an inner circumferential surface of the steering shaft insertion hole 293c, and an annular flange portion 300b received by the upper end surface 293a of the third coupling portion 293. The cylindrical portion 300a is in slidable contact with the collar 303. The annular flange portion 300b is in slidable contact with the collar 302.

The lower bush 301 includes a cylindrical portion 301a fixed to an inner circumferential surface of the steering shaft insertion hole 293c, and an annular flange portion 301b received by the lower end surface 293b of the third coupling portion 293. The cylindrical portion 301a is in slidable contact with the collar 303. The annular flange portion 301b is in slidable contact with the collar 304 at the lower portion.

A steering shaft attachment nut 307 is threadedly engaged with a lower end of the steering axis 290. The steering shaft attachment nut 307 contacts a lower end surface of the intermediate portion 261b of the first rib 261.

According to the above arrangement, the steering shaft 290 is enabled to rotate relative to the third coupling portion 293 about the steering axis S3. The upper support point P1 is arranged on the steering axis S3 at a center or substantially a center of the insertion hole 241a of the upper end portion 241 in the direction of extension of the steering axis S3. The lower support point P2 is arranged on the steering axis S3 at a center or substantially a center of the insertion hole 261d of the first rib 261 in the direction of extension of the steering axis S3.

Referring to FIG. 13, the first structural body 271 preferably has an annular configuration defined by the upper end portion 241, the first front portion 251, the first rib 261, and the first rear portion 254 and is integrally rotatable with the steering shaft 290 about the steering axis S3.

The first structural body 271 of the knuckle 219L is coupled to the upper arm 220 via the coupling unit 223 with the upper support point P1 as the center and is coupled to the lower arm 221 via the coupling unit 223 with the lower support point P2 as the center.

Referring to FIG. 15, the second rib 262 extends straightly or substantially straightly and obliquely upward toward the rear from a portion of connection of the second front portion 252 and the third front portion 253. A rear end of the second rib 262 is connected to a connection portion 308, at which the lower end 254a of the first rear portion 254, the second rear portion 255, and the first rib 261 are connected to each other. The steering shaft attachment nut 307 is disposed in a space between the first rib 261 and the second rib 262.

The second rib 262 and the steering axis S3 intersect with each other. The second rib 262 and the upper support point P1 are aligned vertically.

The third rib 263 is connected to the lower end portion 243 and the connection portion 308. The third rib 263 extends straightly or substantially straightly and obliquely upward toward the rear from the lower end portion 243 toward the connection portion 308. The third rib 263 is an example of a "rectilinear coupling portion" according to a preferred embodiment of the present invention. The third rib 263 continues rectilinearly or substantially rectilinearly to the parallel portion 254b of the first rear portion 254.

The second structural body 272 is defined by the second front portion 252, the third front portion 253, the lower end portion 243, the third rear portion 256, the second rear portion 255, the second rib 262, and the third rib 263. The second structural body 272 is arranged at the lower portion of the first structural body 271 and has a shape that is curved as a whole so as to approach the rear as it approaches the lower portion.

A height of the second structural body 272 with respect to the up/down direction Z is approximately half a height of the first structural body 271 with respect to the up/down direction Z. The second structural body 272 can receive a load acting from the pitching shaft 80 to the knuckle 219L with adequate strength. An adequate strength of coupling with the coupling unit 223 is secured by the first structural body 271 preferably having the annular form that sandwiches the third coupling portion 293 of the coupling unit 223 from above and below.

Figure 17:
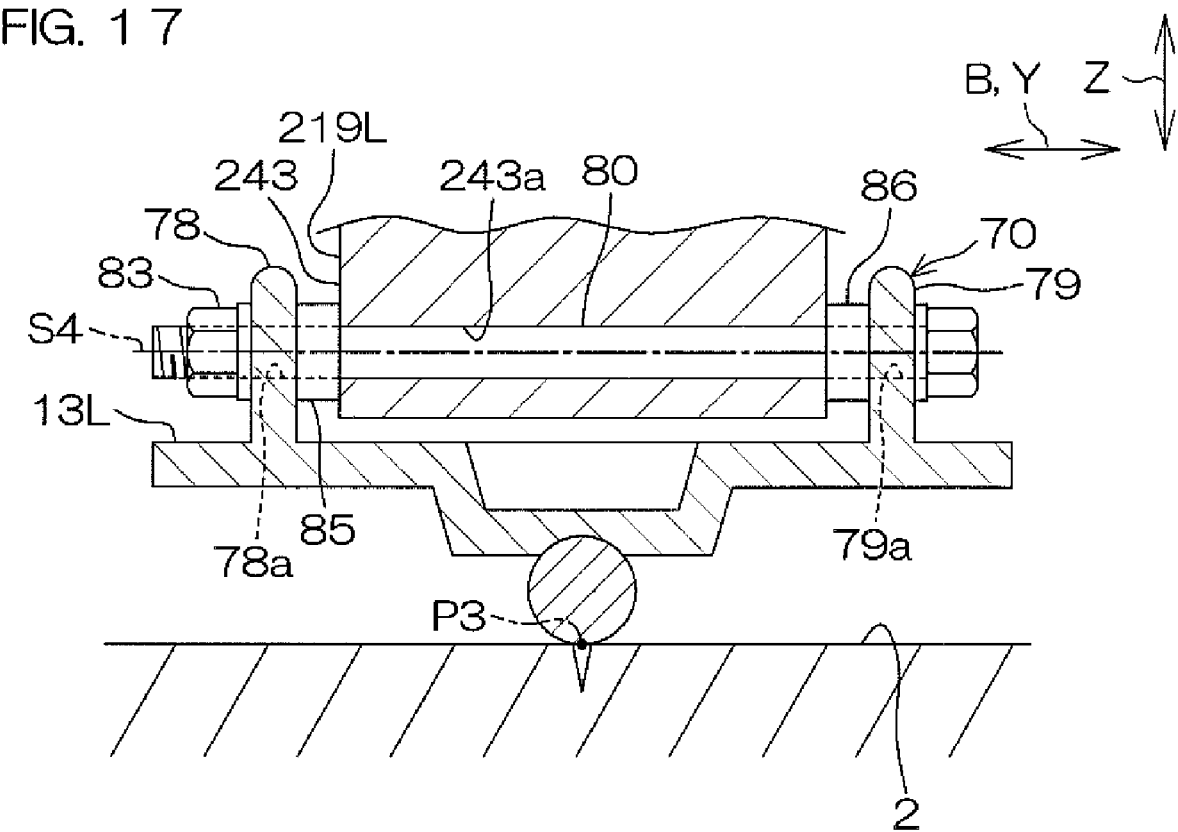
FIG. 17 is a sectional view of a state where a ski member is attached to the knuckle as viewed in a front/rear direction.

FIG. 17 is a sectional view of a state where the ski member 13L is attached to the knuckle 219L as viewed in the front/rear direction X. The lower end portion 243 of the knuckle 219L is arranged between the pair of side plates 78 and 79 of the ski coupling unit 70.

The ski attachment member 81 couples the ski member 13L and the knuckle 219L in a manner enabling relative rotation about the pitching axis S4, which is the central axis of the pitching shaft 80. The pitching axis S4 extends in the width direction B of the ski member L.

The pitching shaft 80 of the ski attachment bolt 82 is inserted through the screw insertion hole 78a formed in one side plate 78, the screw insertion hole 243a of the knuckle 219L, and the screw insertion hole 79a formed in the other side plate 79. The ski attachment nut 83 is threadedly engaged with the tip of the pitching shaft 80.

One collar 85 is arranged between one side plate 78 and the knuckle 219L, and the other collar 86 is arranged between the other side plate 79 and the knuckle 219L.

By changing thicknesses of the respective collars 85 and 86, the position of the ski member 13L in the right/left direction with respect to the knuckle 219L (position of the load center point P3) can be changed.

Referring to FIG. 15, the swinging of the ski member 13L by no less than a predetermined amount about the pitching shaft 80 from the reference attitude is restricted by the second structural body 272 of the knuckle 219L.

Specifically, an outer side surface of the third front portion 253 of the second structural body 272 opposes the base 74 of the ski member 13L. A stopper 258 is provided on the outer side surface. When the swinging amount of the ski member 13L from the reference position to one side (arrow C1 direction) about the pitching shaft 80 reaches the predetermined amount, the base 74 of the ski member 13L contacts the stopper 258 and the swinging of the ski member 13L is restricted.

An outer side surface of the portion of connection of the third rear portion 256 and the second rear portion 255 of the second structural body 272 opposes the base 74 of the ski member 13L. A stopper 259 is provided on the outer side surface. When the swinging amount of the ski member 13L from the reference position to the other side (arrow C2 direction) about the pitching shaft 80 reaches the predetermined amount, the base 74 of the ski member 13L contacts the stopper 259 and the swinging of the ski member 13L is restricted.

The pitching shaft 80 is coupled to the third rib 263 (rectilinear coupling portion) via the lower end portion 243. The pitching shaft 80 is aligned with the third front portion 253 along the direction of extension of the third front portion 253 and is aligned with the third rear portion 256 along the direction of extension of the third rear portion 256. The pitching shaft 80 is aligned substantially in a straight line with the third rib 263 and the parallel portion 254b of the first rear portion 254.

The lower end portion 243 is thereby enabled to receive large loads from various directions from the pitching shaft 80. When a load F201 that is directed obliquely upward toward the front from the pitching shaft 80 toward the lower end portion 243 acts, this load can be received firmly by the third front portion 253. When a load F202 that is directed obliquely upward toward the rear from the pitching shaft 80 toward the lower end portion 243 acts, this load can be received firmly by the third rib 263 and the first rear portion 254. When a load F203 that is directed obliquely upward toward the rear from the pitching shaft 80 toward the lower end portion 243 acts, this load can be received firmly by the third rear portion 256.

A portion of a force that acts on the knuckle 219L from the ski member 13L via the pitching shaft 80 is transmitted to the upper end surface 293a of the third coupling portion 293 via the third rib 263, the first rear portion 254, and the upper end portion 241. A portion of the force that acts on the knuckle 219L from the ski member 13L via the pitching shaft 80 is transmitted to the lower end surface 293b of the third coupling portion 293 via the third rib 263 and the first rib 261.

A portion of the force that acts on the knuckle 219L from the ski member 13L via the pitching shaft 80 is transmitted to the upper end surface 293a of the third coupling portion 293 via the front portion forming member 242 and the upper end portion 241. A portion of the force that acts on the knuckle 219L from the ski member 13L via the pitching shaft 80 is transmitted to the lower end surface 293b of the third coupling portion 293 via the third front portion 253, the second front portion 252, and the first rib 261. The force that acts on the knuckle 219L from the ski member 13L via the pitching shaft 80 is thus dispersed and transmitted to the third coupling portion 293.

Moreover, a lattice-shaped structure is provided in a vicinity of the pitching shaft 80 by the third front portion 253, the lower end portion 243, the third rear portion 256, the second rib 262, and the third rib 263 of the second structural body 272, and the second structural body 272 is thus extremely high in strength.

With respect to the front/rear direction X, the pitching axis S4 is arranged between the lower end 251a of the first front portion 251 and the lower end 254a of the first rear portion 254. With respect to the front/rear direction X, the pitching axis S4 is arranged between the lower end 251a of the first front portion 251 and the lower support point P2.

The kingpin offset L1 is the horizontal distance between the pitching axis S4 and the steering axis S3.

The horizontal distance L2 from the pitching axis S4 to the reference normal S6 is shorter than the kingpin offset L1 (L2<L1). The kingpin offset L1 is thereby made to have an adequately large value and, at the same time, the offset L3, defined by the distance (shortest distance) between the pitching axis S4 and the steering axis S3 is made to have an adequately large value.

The ranges of the caster angle A1, the kingpin offset L1, and the offset L3 are preferably the same as in the first preferred embodiment of the present invention, and the kingpin offset L1 and the offset L3 are made to have adequately large values. The displacement amount of the load center point P3 with respect to the right/left direction Y when the ski member 13L and the knuckle 219L are pivoted clockwise about the steering axis S3 from the straight drive state (during right turning) can thereby be made large reliably.

As described above, according to the present preferred embodiment of the present invention, the horizontal distance L2 from the pitching axis S4 to the reference normal S6 in the reference attitude state is made shorter than the kingpin offset L1. The kingpin offset L1 can thereby be made longer. Thus, during travel of the snowmobile 1, a force tending to return the ski member 13L to the position in the straight travel state arises (a caster effect arises). Riding comfort of the snowmobile 1 during straight travel can thereby be enhanced. When the knuckle 219L and the ski member 13L at the left side are pivoted clockwise to perform turning to the right, the movement amount of the load center point P3 to the left side (outer side of the turn) can be made adequately large.

The position of the load center point P3 of the ski member 13L that is positioned at the outer side of the right turn is thus positioned, during the turning of the snowmobile 1, at a more outwardly located point of the turn in comparison to the straight drive state.

The ski member 13L can consequently receive a load at the more outwardly located point of the turn, and movement of the snowmobile 1 during turning can thus be made sportier. The fun of driving the snowmobile 1 can thus be enhanced because the riding comfort of the snowmobile 1 during straight travel can be enhanced and yet the movement of the snowmobile 1 during turning can be made sportier.

Moreover, in addition to elongating the kingpin offset L1, the horizontal distance L2 from the reference normal S6 to the pitching axis S4 is made shorter than the kingpin offset L1. Further, the offset L3 is preferably made no less than about 30 mm, for example. The distance with respect to the front/rear direction X between the load center point P3 of the ski member 13L and the lower support point P2 can thus be shortened. The moment acting about the lower support point P2 when the load from the snow surface 2 acts upward to the load center point P3 can thus be lessened. The bending moment that acts on the knuckle 219L can thus be lessened, and the loads applied to the knuckle 219L, the upper arm 220 and the lower arm 221 that support the knuckle 219L, etc., and especially the load applied to the lower arm 221 can be lessened. An excellent effect of reduction in the loads applied to the knuckle 219L, the upper arm 220 and the lower arm 221 arranged to support the knuckle 219L, etc., which tend to increase in load as the turning performance is enhanced, can thereby be provided.

Thus, during the right turning of the snowmobile 1, the position of the load center point P3 in the ski member 13L at the outer side of the turn that receives a larger force than in the ski member 13R at the inner side of the turn can be moved by a large amount toward the outer side of the turn in comparison to during straight travel. The riding comfort of the snowmobile 1 during straight travel can thus be enhanced and yet the movement of the snowmobile 1 during turning can be made sportier.

By making the offset L3 no less than about 30 mm, for example, the pitching axis S4 can be arranged adequately far from the steering axis S3. Thus, when the knuckle 219L and the ski member 13L are pivoted clockwise, the movement amount of the load center point P3 to the left side, which is the outer portion of the turn, can be made adequately large.

Consequently, the riding comfort during straight travel can be enhanced and yet the movement of the snowmobile 1 during turning can be made sportier. Moreover, by making the offset L3 no less than about 30 mm, for example, practically any driver can be made to feel good riding comfort during straight travel and feel that movement during turning of the snowmobile 1 is sporty.

The knuckle 219L is supported on the upper arm 220 at the upper support point P1, and is supported on the lower arm 221 at the lower support point P2. According to this arrangement, the knuckle 219L can be supported by the pair of the upper and lower arms 220 and 221. A load acting from the knuckle 219L can be received reliably by the lower arm 221.

The knuckle 219L and the pair of upper and lower arms 220 and 221 can be coupled with high rigidity by use of the coupling unit 223.

Further, the first coupling portion 291 of the coupling unit 223 and the upper arm 220 are coupled via the upper support shaft 294. The upper arm 220 and the first coupling portion 291 can thereby be coupled while enabling the upper arm 220 to swing with respect to the first coupling portion 291.

The second coupling portion 292 and the lower arm 221 are coupled via the lower support shaft 297. The lower arm 221 and the second coupling portion 292 can thereby be coupled while enabling the lower arm 221 to swing with respect to the second coupling portion 292.

Further, the first structural body 271 of the knuckle 219L sandwiches the third coupling portion 293 from above and below. The upper end and the lower end of the third coupling portion 293 can thereby be coupled respectively with the first structural body 271 of the knuckle 219L. The rigidity of coupling of the coupling unit 223 and the knuckle 219L can thereby be increased further. By arranging the third coupling portion 293 so as to be sandwiched by the first structural body 271 from above and below, a bending force acting on the knuckle 219L from the ski member 13L is unlikely to be transmitted to the third coupling portion 293. Acting of an excessive bending force on the third coupling portion 293 can thereby be prevented.

The steering shaft 290 supported by the third coupling portion 293, and the first structural body 271 of the knuckle 219L are preferably coupled in an integrally rotatable manner. The rigidity of the coupling of the knuckle 219L and the third coupling portion 293 of the coupling unit 223 can thereby be increased. Consequently, the position of the steering axis S3 can be reliably prevented from shifting with respect to the coupling unit 223 and the respective arms 220 and 221. Further, by sandwiching the third coupling portion 293 from above and below by the first structural body 271, the bending force that acts on the knuckle 219L is made unlikely to be transmitted to the third coupling portion 293, and arising of a bending force in the steering shaft 290 that is inserted through the third coupling portion 293 can thus be prevented. The steering shaft 290 can thus be pivoted more smoothly.

Further, the first rear portion 254 of the first structural body 271 is arranged to extend across the upper support point P1 and the lower support point P2 at the rear of the third coupling portion 293. The third coupling portion 293 of the coupling unit 223 and the first rear portion 254 of the knuckle 219 are thereby made to serve as two pillars that receive the load from the ski member 13L. Thus, even when the ski member 13L receives a large force from the snow surface 2, the large force can be received firmly by the two pillars.

With respect to the front/rear direction X, the pitching axis S4 is arranged between the lower support point P2 and the lower end 254a of the first rear portion 254. The load from the load center point P3 can thereby be received reliably by the first rear portion 254 while disposing the pitching axis S4 (load center point P3) adequately to the rear with respect to the steering axis S3.

With respect to the front/rear direction X, the pitching axis S4 is arranged between the lower end 251a of the first front portion 251 and the lower end 254a of the first rear portion 254. The third coupling portion 293 of the coupling unit 223, and the first front portion 251 and the first rear portion 254 of the knuckle 219L are thereby made to serve as three pillars that receive the load from the ski member 13L. Thus, even when the ski member 13L receives a large force from the snow surface 2, the large force can be received firmly by the three pillars.

Further, with respect to the front/rear direction X, the pitching axis S4 is arranged between the lower end 251a of the first front portion 251 and the lower support point P2. The load from the pitching axis S4 (load center point P3) can thereby be received reliably by the first front portion 251.

The pitching axis S4 is arranged substantially along an extension of the parallel portion 254b of the first rear portion 254. The load acting on the first rear portion 254 from the pitching axis S4 (load center point P3) can thereby be received by the parallel portion 254b. By the parallel portion 254b extending parallel to the steering axis S3, the first rear portion 254 can be increased in strength against a force directed from the ski member 13L to the first rear portion 254 and acting in a direction parallel to the steering axis S3.

Further, the knuckle 219L and the coupling unit 223 can be coupled firmly by the coupling of the first structural body 271 of the knuckle 219L and the third coupling portion 293 of the coupling unit 223. The second structural body 272 and the ski member 13L can be coupled by the coupling of the second structural body 272 and the pitching shaft 80. By the first structural body 271 and the second structural body 272 being integral with each other, the strength of the knuckle 219L can be increased further.

The second structural body 272 is curved so as to approach the rear as it approaches the lower portion. The pitching axis S4 can thereby be arranged at a more rearward portion of the vehicle. With the second structural body 272, an outer frame portion is formed by the second front portion 252, the third front portion 253, the lower end portion 243, the third rear portion 256, and the second rear portion 255, and, the outer frame portion is reinforced by the second rib 262 and the third rib 263. By adopting such a structure of high rigidity, the pitching shaft 80 can be arranged adequately to the rear with respect to the steering axis S3.

For example, an arrangement where a bracket is extended from the lower end of the third coupling portion 293 and the pitching axis S4 is arranged far to the rear from the steering axis S3 by coupling the pitching shaft 80 to the bracket may be considered. However, according to such an arrangement, the bracket must be made large to provide the bracket with an adequate rigidity, and the structural balance thus becomes poor. Thus, in this case, the upper limit of the kingpin offset L1 is small and approximately 10 mm, for example, is the limit.

On the other hand, according to the arrangement where the pitching shaft 80 is coupled to the second structural body 272, the pitching shaft 80 can be arranged at a position far from the steering axis S3 because the second structural body 272 can be made a structure that is compact and adequately high in strength. The kingpin offset L1 can thus be made adequately long.

The load F202 that acts on the first rear portion 254 from the pitching axis S4 (load center point P3) can be received by the third rib 263 and the parallel portion 254b of the first rear portion 254. Moreover, by the third rib 263 and the parallel portion 254b extending in parallel to the steering axis S3, the force F 203, which is a force that is directed from the ski member 13L to the first rear portion 254 and is parallel to the steering axis S3, is made a compressive load that acts substantially along a longitudinal direction of the third rib 263. An allowable load that can be received by the third rib 263 and the first rear portion 254a can thus be increased further.

By the stoppers 258 and 259 being provided in the second structural body 272, the ski member 13L can be prevented from swinging more than necessary about the pitching axis S4.

Fifth Preferred Embodiment

Figure 18:
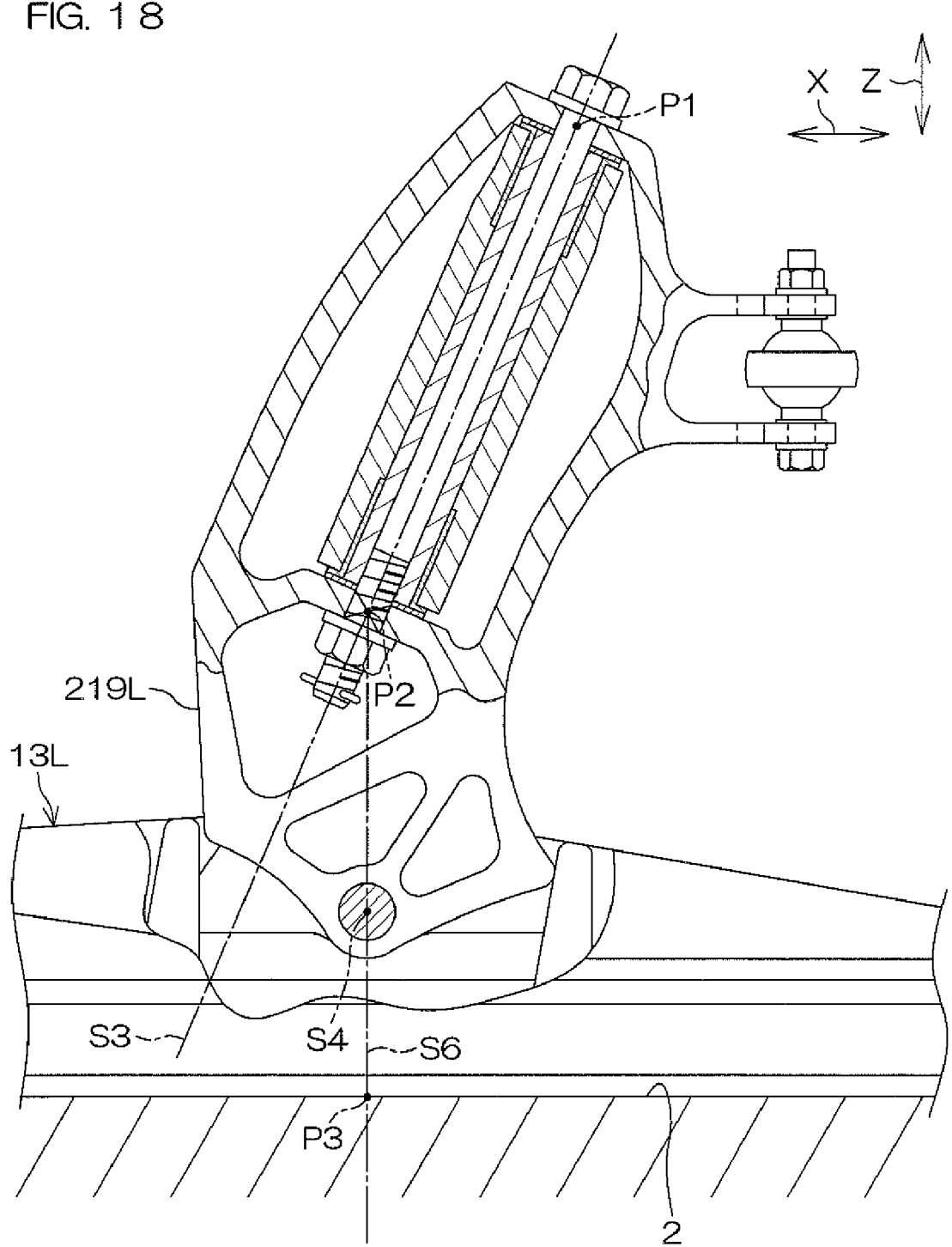
FIG. 18 is a left side view of principal portions of a fifth preferred embodiment of the present invention.

FIG. 18 is a left side view of principal portions of a fifth preferred embodiment of the present invention. With the fifth preferred embodiment of the present invention, arrangements that are the same as those of the fourth preferred embodiment shall be provided with the same symbols and description thereof shall be omitted.

In the fifth preferred embodiment, the pitching axis S4 is arranged so as to pass through the reference normal S6.

According to the present preferred embodiment of the present invention, the pitching axis S4 can be arranged adequately far from the steering axis S3. The moment acting about the lower support point P2 when the load from the snow surface 2 acts upward to the load center point P3 can be made equal to zero. The bending moment acting on the knuckle 219L can thus be made extremely small, and the loads applied to the knuckle 219L, the upper arm 220 and the lower arm 221 that support the knuckle 219L, etc., can be decreased further.

Sixth Preferred Embodiment

Figure 19:
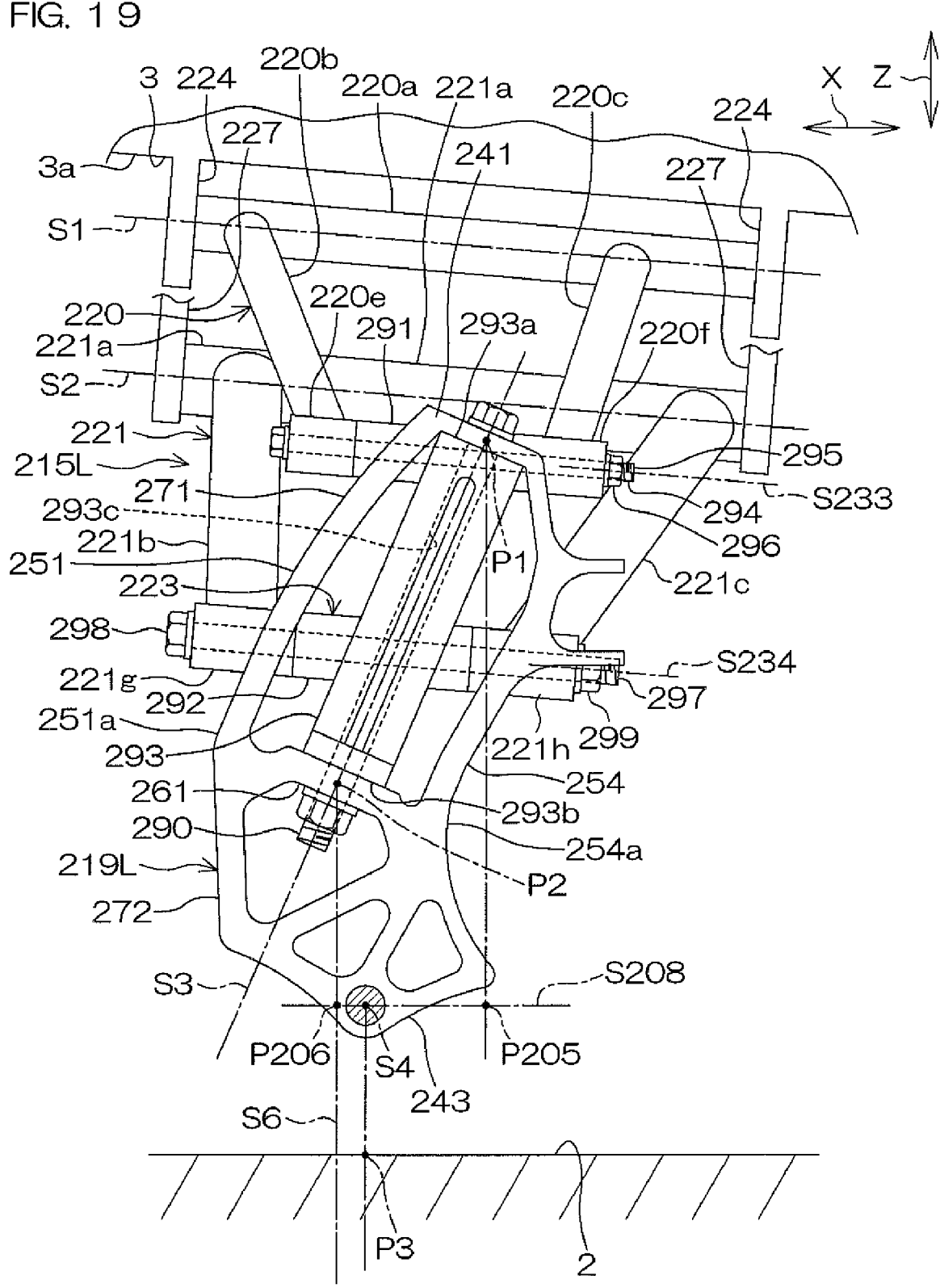
FIG. 19 is a left side view of principal portions of a sixth preferred embodiment of the present invention.

FIG. 19 is a left side view of principal portions of a sixth preferred embodiment of the present invention. In the following description, points that differ from the fifth preferred embodiment of the present invention shall be described. With the sixth preferred embodiment of the present invention, arrangements that are the same as those of the fifth preferred embodiment of the present invention shall be provided with the same symbols and description thereof shall be omitted.

In the sixth preferred embodiment of the present invention, the pitching axis S4 is arranged between the upper support point P1 and the lower support point P2 with respect to the front/rear direction X. With respect to the front/rear direction X, the pitching axis S4 is arranged between the lower support point P2 and the lower end 254a of the first rear portion 254.

More specifically, an intersection of a vertical line which passes through the upper support point P1, and a horizontal line S208 which passes through the pitching axis S4, is referred to as a point P205. An intersection of the reference normal S6 which passes through the lower support point P2, and the horizontal line S208 is referred to as a point P206. The pitching axis S4 is arranged between the point P205 and the point P206 in the horizontal line S208.

According to the present preferred embodiment of the present invention, with respect to the front/rear direction X, the pitching axis S4 is arranged between the upper support point P1 and the lower support point P2. The load from the load center point P3 of the ski member 13L can thereby be received by both the upper arm 220 and the lower arm 221. The load from the ski member 13L and the knuckle 219L can thus be received in a well-balanced manner by the pair of upper and lower arms 220 and 221. Consequently, the support rigidity of the knuckle 219L can be increased further.

With respect to the front/rear direction X, the pitching axis S4 is arranged between the lower support point P2 and the lower end 254a of the first rear portion 254. The load from the load center point P3 can thereby be received reliably by the first rear portion 254 while positioning the pitching axis S4 (load center point P3) adequately to the rear with respect to the steering axis S3.

Seventh Preferred Embodiment

Figure 20A:
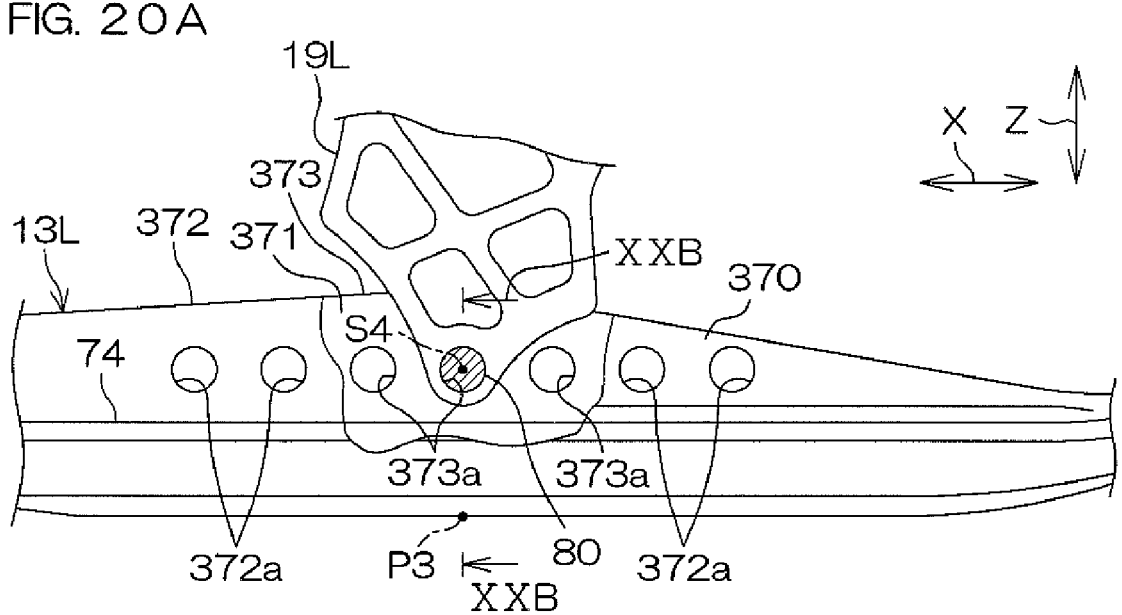
FIG. 20A is a partially sectional left side view of principal portions of a seventh preferred embodiment of the present invention.
Figure 20B:
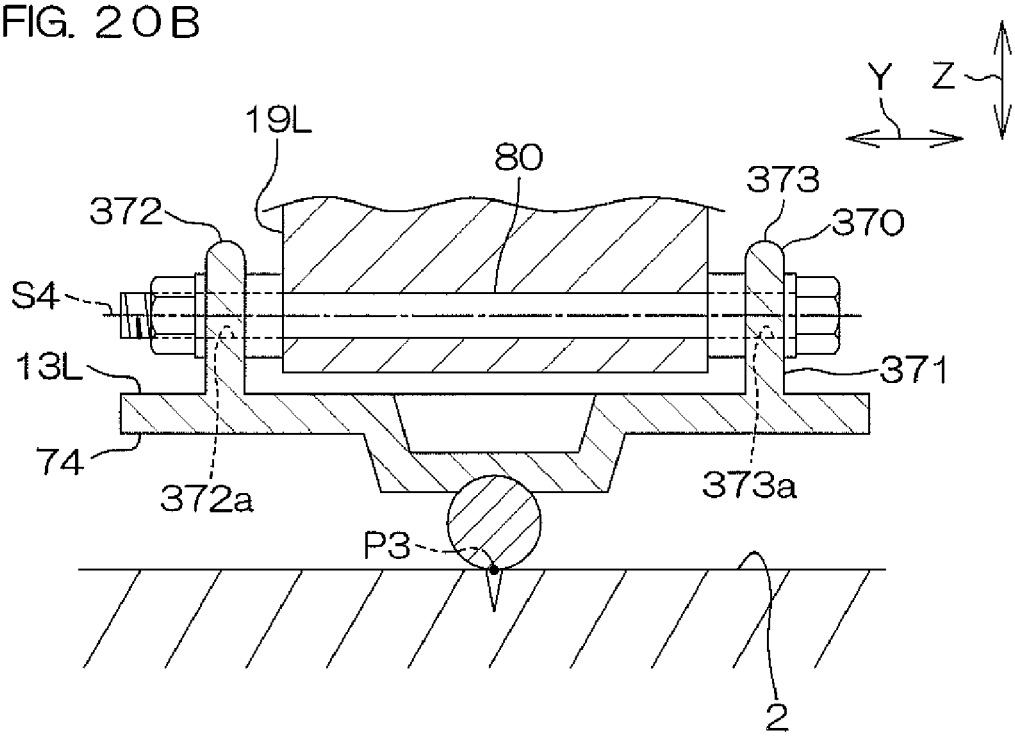
FIG. 20B is a sectional view taken along line XXB-XXB in FIG. 20A.

FIG. 20A is a partially sectional left side view of principal portions of a seventh preferred embodiment of the present invention, and FIG. 20B is a sectional view taken along line XXB-XXB in FIG. 20A. In the following description, points that differ from the first preferred embodiment of the present invention shall be described. With the seventh preferred embodiment of the present invention, arrangements that are the same as those of the first preferred embodiment of the present invention shall be provided with the same symbols and description thereof shall be omitted.

In the present preferred embodiment of the present invention, a ski coupling unit 370 includes an attachment unit 371. The attachment unit 371 attaches the ski member 13L to the knuckle 19L in a manner enabling adjustment of the position with respect to the front/rear direction X.

The attachment unit 371 includes a pair of side plates 372 and 373 that are preferably integral with the base 74 of the ski member 13L. Pluralities of insertion holes 372a and 373a with intervals with respect to the front/rear direction X have provided in the side plates 372 and 373, respectively. By alternatively inserting the pitching shaft 80 in the insertion holes 372a and 373a, the position of the ski member 13L with respect to the knuckle 19L with respect to the front/rear direction X can be changed.

Figure 21:
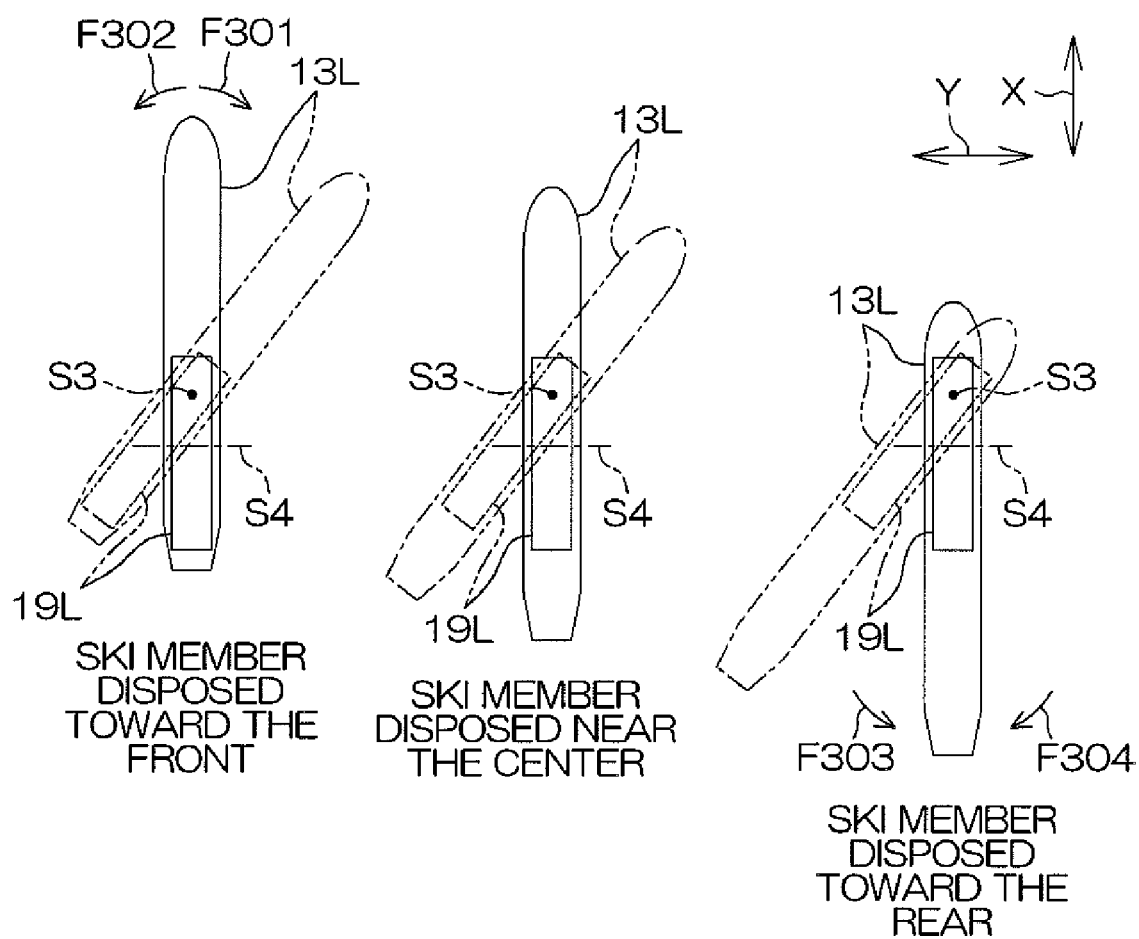
FIG. 21 shows schematic plan views for explaining attachment positions of a ski member.

FIG. 21 shows schematic plan views for explaining attachment positions of the ski member 13L. In a case where the pitching axis S4 is arranged toward a rear end of the ski member 13L, the ski member 13L is arranged toward the front with respect to the pitching axis S4 as shown at a left side in FIG. 21. The distance from the pitching axis S4 to a tip of the ski member 13L is made long. When the ski member 13L is pivoted about the steering axis S3 during straight travel on the snow surface 2, a force that promotes the pivoting of the ski member 13L about the steering axis S3 arises, and the pivoting of the ski member 13L is promoted. For example, when right turning is performed, a clockwise force F301 arises, and when left turning is performed, a counterclockwise force F302 arises. A small force thus suffices for operation of a handle (not shown) when turning from the straight drive state, and a contribution can be made to the turning performance.

On the other hand, in a case where the pitching axis S4 is arranged toward a front end of the ski member 13L, the ski member 13L is arranged toward the rear with respect to the pitching axis S4 as shown at a right side in FIG. 21. Here, the distance from the pitching axis S4 to the rear end of the ski member 13L is made long. Thus, during right turning, a force F303 tending to return the ski member 13L to the position in the straight drive state acts. During left turning, a force F304 tending to return the ski member 13L to the position in the straight drive state acts. A small force thus suffices for operation of the handle (not shown) when returning the ski member 13L from the turning state to the straight drive state.

When the pitching axis S4 is arranged at substantially the center of the ski member 13L, the ski member 13L is positioned at the middle with respect to the pitching axis S4 as shown in a middle of FIG. 21. Here, the distance from the pitching axis S4 to the front end of the ski member 13L is made substantially the same as the distance from the pitching axis S4 to the rear end of the ski member 13L. The force required for operation of the handle can thus be made substantially the same both when pivoting the handle from the straight drive position during travel and when returning the handle to the straight drive position.

According to the present preferred embodiment of the present invention, the position of the ski member 13L with respect to the knuckle 19L can be adjusted with respect to the front/rear direction X. The more the ski member 13L is arranged to the front portion with respect to the knuckle 19L, the more promoted is the pivoting of the ski member 13L in the pivoting direction when the ski member 13L is pivoted. The ski member 13L can thus be pivoted with a smaller force. Consequently, the snowmobile 1 can be turned smoothly and more comfortably. In addition, the more the ski member 13L is arranged to the rear with respect to the knuckle 19L, the greater the force (restoring force) that tends to return the ski member 13L to the position in vehicle straight drive. Straight drive performance of the snowmobile 1 is thus enhanced, and for the driver, operation during straight travel is made easier.

According to the arrangement where the load center point P3 of the ski member 13L is arranged at a more outwardly located point of the turn during right turning of the snowmobile 1, the force required for pivoting the ski member 13L tends to be large. However, by disposing the ski member 13L more frontward with respect to the knuckle 19L, the pivoting of the ski member 13L in the pivoting direction when the ski member 13L is pivoted is promoted, and the force required for steering can be lessened.

Figure 22:
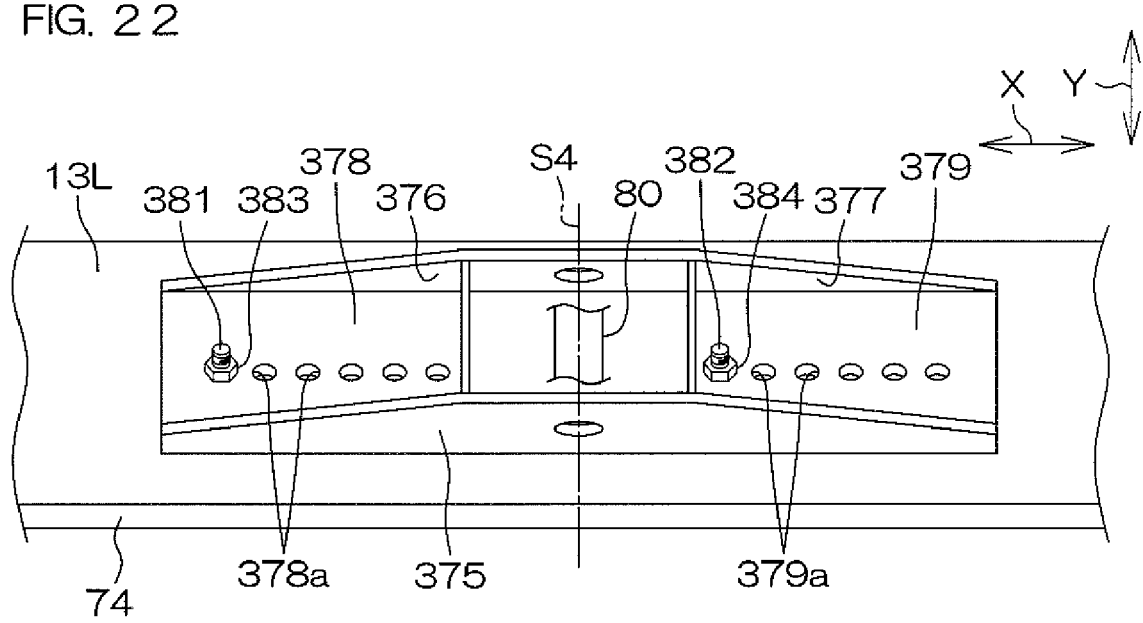
FIG. 22 is a perspective view of a modification preferred embodiment of the seventh preferred embodiment of the present invention.

Although in FIG. 20, the plurality of insertion holes 372a and 373a are preferably provided in the pair of side plates 372 and 373 that are preferably integral with the ski member 13L, the present invention is not restricted to this arrangement. For example, as shown in FIG. 22, a pair of side plates 375 and 376 may be separate members from the base 74 of the ski member 13L. In this case, the attachment unit 377 includes the pair of side plates 375 and 376 and bottom plates 378 and 379 that couple the pair of side plates 375 and 376. The bottom plates 378 and 379 are arranged so as to sandwich the pitching shaft 80 in the front/rear direction X. A plurality of screw insertion holes 378a and 379a that are aligned in the front/rear direction X are formed respectively in the front bottom plate 378 and the rear bottom plate 379.

An attachment bolt 381 is inserted through one of the plurality of screw insertion holes 378a of the bottom plate 378. Likewise, an attachment bolt 382 is inserted through one of the plurality of screw insertion holes 379a of the bottom plate 379. The attachment bolts 381 and 382 are inserted through screw insertion holes (not shown) provided in the base 74. Tips of the attachment bolts 381 and 382 respectively protrude from the corresponding bottom plates 378 and 379 and are put in threaded engagement with corresponding attachment nuts 383 and 384.

The relative position of the ski member 13L and the pitching shaft 80 (knuckle 19L) with respect to the front/rear direction X can be adjusted by changing the positions of the attachment bolts 381 and 382.

Although a plurality of preferred embodiments of the present invention have been described above, the present invention can be put into practice in yet other modes as well.

For example, although each of the fourth to sixth preferred embodiments of the present invention preferably includes the coupling unit 223, the upper arm 220 and the first coupling portion 291 of the coupling unit 223 being coupled by the upper support shaft 294, the present invention is not restricted thereto. The upper arm 220 and the first coupling portion 291 of the coupling unit 223 may instead be coupled by a spherical joint.

In each of the fourth to sixth preferred embodiments of the present invention, at least one of the second rib 262 and the third rib 263 of the second structural body 272 may be omitted.

Although in the seventh preferred embodiment of the present invention, the ski member 13L and the knuckle 19L of the first preferred embodiment of the present invention are preferably coupled, the present invention is not restricted to this arrangement. An arrangement is also possible where the ski member 13L is coupled with the corresponding knuckle 19L or 219L of any of the second to sixth preferred embodiments of the present invention.

Although according to the first to seventh preferred embodiments of the present invention, a double wishbone type suspension device was described as being preferable, the present invention is not restricted thereto. Another type of suspension device, such as a leading arm type suspension device, a trailing arm type suspension device, a strut type suspension device, etc., may be adopted as the front suspension device 15L.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snow vehicle for travel on a snow surface, the snow vehicle comprising:
a vehicle body;
an arm member supported with respect to the vehicle body so as to swing about a swinging axis which extends in a vehicle front to rear direction, the arm member including a cushioning member disposed between the arm member and the vehicle body;
a knuckle supported with respect to the arm member at a support point;
a coupling unit arranged to couple the knuckle to the arm member such that the knuckle pivots about a steering axis with respect to the arm member;
a ski member arranged to slide on the snow surface; and
a ski coupling unit arranged to couple the ski member to the knuckle such that the ski member pivots about a pitching axis with respect to the knuckle, the pitching axis extending in a width direction of the ski member, the pitching axis being disposed such that, when the vehicle is placed on a horizontal surface, a horizontal distance from the pitching axis to a reference line extending normal to the horizontal surface from the support point is shorter than a horizontal distance from the pitching axis to the steering axis.

2. The snow vehicle according to claim 1, wherein an offset defined by a distance between the pitching axis and the steering axis is no less than about 30 mm.

3. The snow vehicle according to claim 1, wherein the pitching axis is arranged to pass through the reference line.

4. The snow vehicle according to claim 1, wherein the ski coupling unit includes an attachment unit arranged to attach the ski member to the knuckle to enable adjustment of a position in the vehicle front to rear direction.

5. The snow vehicle according to claim 1, further comprising:
a double wishbone type suspension device including a pair of an upper arm and a lower arm; wherein
the lower arm is the arm member; and
the knuckle is supported on the upper arm at an upper support point at an upper portion relative to the support point and is supported on the lower arm at a lower support point as the support point.

6. The snow vehicle according to claim 5, wherein the pitching axis is disposed between the upper support point and the lower support point with respect to the vehicle front to rear direction.

7. The snow vehicle according to claim 5, wherein the coupling unit includes a first coupling portion coupled to the upper arm, a second coupling portion coupled to the lower arm, and a third coupling portion coupled to the knuckle such that the third coupling portion pivots about the steering axis with respect to the knuckle.

8. The snow vehicle according to claim 7, wherein the first coupling portion and the upper arm are coupled via an upper support shaft which extends in the vehicle front to rear direction such that the first coupling portion pivots about the upper support shaft with respect to the upper arm.

9. The snow vehicle according to claim 7, wherein the second coupling portion and the lower arm are coupled via a lower support shaft which extends in the vehicle front to rear direction such that the second coupling portion pivots about the lower support shaft with respect to the lower arm.

10. The snow vehicle according to claim 7, wherein the knuckle includes a first structural body arranged to sandwich the third coupling portion from above and below.

11. The snow vehicle according to claim 10, further comprising:
a steering shaft arranged to penetrate through the third coupling portion along the steering axis and supported by the third coupling portion such that the steering shaft rotates about the steering axis with respect to the third coupling portion; wherein
the steering shaft and the first structural body are coupled rotatably together about the steering axis.

12. The snow vehicle according to claim 10, wherein the first structural body includes a rear portion arranged to extend across the upper support point and the lower support point at a rear of the third coupling portion.

13. The snow vehicle according to claim 12, wherein the pitching axis is disposed between the lower support point and a lower end of the rear portion with respect to the vehicle front to rear direction.

14. The snow vehicle according to claim 12, wherein the first structural body includes a front portion arranged to extend across the upper support point and the lower support point at a front portion of the third coupling portion; and
the pitching axis is disposed between a lower end of the front portion and the lower end of the rear portion with respect to the vehicle front to rear direction.

15. The snow vehicle according to claim 14, wherein the pitching axis is disposed between the lower end of the front portion and the lower support point with respect to the vehicle front to rear direction.

16. The snow vehicle according to claim 12, wherein the rear portion includes a substantially parallel portion arranged to extend parallel or substantially parallel to the steering axis; and the pitching axis is disposed on an extension of the substantially parallel portion.

17. The snow vehicle according to claim 10, wherein the knuckle includes a second structural body that is integral with the first structural body and disposed at a lower portion of the first structural body;

the ski coupling unit includes a pitching shaft arranged to couple the ski member to the knuckle such that the ski member swings about the pitching axis with respect to the knuckle; and the pitching shaft is coupled to the second structural body.

18. The snow vehicle according to claim 17, wherein the second structural body is curved so as to approach a rear of the vehicle as the second structural body approaches a lower portion.

19. The snow vehicle according to claim 17, wherein the first structural body includes a rear portion arranged to extend across the upper support point and the lower support point at a rear of the third coupling portion;

the rear portion includes a substantially parallel portion arranged to extend parallel or substantially parallel to the steering axis; and the second structural body includes a rectilinear coupling portion arranged to be continuous in a substantially straight line with the substantially parallel portion and to be coupled to the pitching shaft.

20. The snow vehicle according to claim 19, wherein the second structural body includes a stopper arranged to restrict the swinging of the ski member about the pitching axis.

21. The snow vehicle according to claim 5, wherein the coupling unit includes an upper spherical joint and a lower spherical joint disposed at a lower portion relative to the upper spherical joint, and the knuckle is coupled to the upper arm via the upper spherical joint at the upper support point and is coupled to the lower arm via the lower spherical joint at the lower support point.

22. The snow vehicle according to claim 21, wherein the knuckle includes a first structural body arranged to be connected to the upper spherical joint and the lower spherical joint; and the first structural body includes a rear portion arranged to extend from the upper support point toward the lower support point at a rear of the upper spherical joint and the lower spherical joint.

23. The snow vehicle according to claim 22, wherein the pitching axis is disposed between the lower support point and a lower end of the rear portion with respect to the vehicle front to rear direction.

24. The snow vehicle according to claim 22, wherein the first structural body includes a front portion arranged to extend from the upper support point toward the lower support point at a front portion of the upper spherical joint and the lower spherical joint; and the pitching axis is disposed between a lower end of the front portion and the lower end of the rear portion with respect to the vehicle front to rear direction.

25. The snow vehicle according to claim 24, wherein the pitching axis is disposed between the lower end of the front portion and the lower support point with respect to the vehicle front to rear direction.

26. The snow vehicle according to claim 21, wherein the knuckle includes a second structural body that is integral with the first structural body and disposed at a lower portion of the first structural body;

the ski coupling unit includes a pitching shaft arranged to couple the ski member to the knuckle such that the ski member swings about the pitching axis with respect to the knuckle; and the pitching shaft is coupled to the second structural body.

27. The snow vehicle according to claim 26, wherein the second structural body includes a stopper arranged to restrict the swinging of the ski member about the pitching axis.

28. A snow vehicle for travel on a snow surface, the snow vehicle comprising:

a vehicle body;

an arm member supported with respect to the vehicle body so as to swing about a swinging axis which extends in a vehicle front to rear direction, the arm member including a cushioning member disposed between the arm member and the vehicle body;

a knuckle supported with respect to the arm member at a support point;

a coupling unit arranged to couple the knuckle to the arm member such that the knuckle pivots about a steering axis with respect to the arm member;

a ski member arranged to slide on the snow surface; and a ski coupling unit arranged to couple the ski member to the knuckle such that the ski member pivots about a pitching axis with respect to the knuckle, the pitching axis extending in a width direction of the ski member, the pitching axis being disposed such that an offset defined by a distance with respect to the steering axis is no less than about 30 mm.

* * * * *